Sept. 25, 1928.
G. BROWNING
COMPUTING MACHINE
Filed Jan. 15, 1920
1,685,583
12 Sheets-Sheet 7
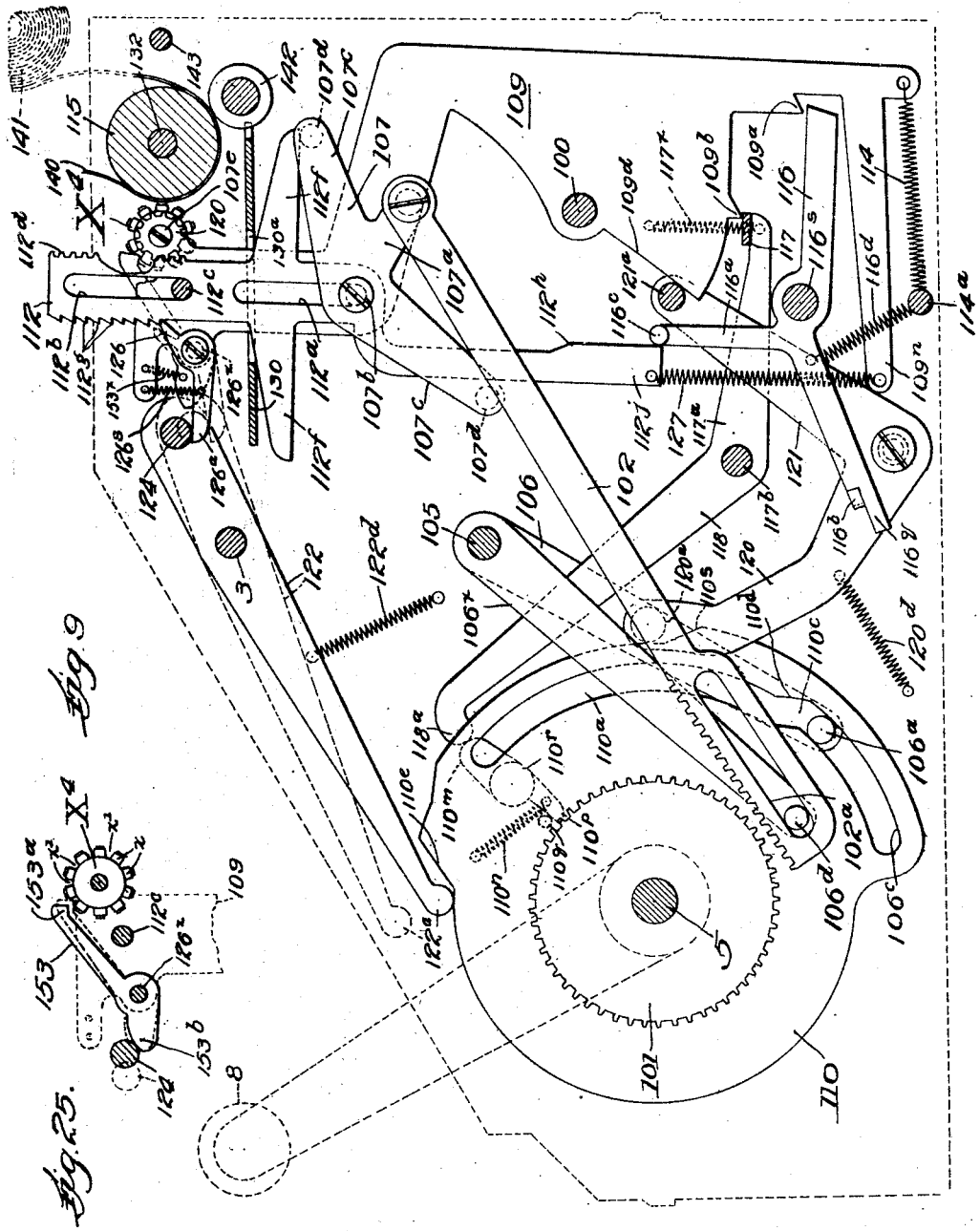
Inventor:
George Browning,
by Burton & Burton
his Attys;
Witness:

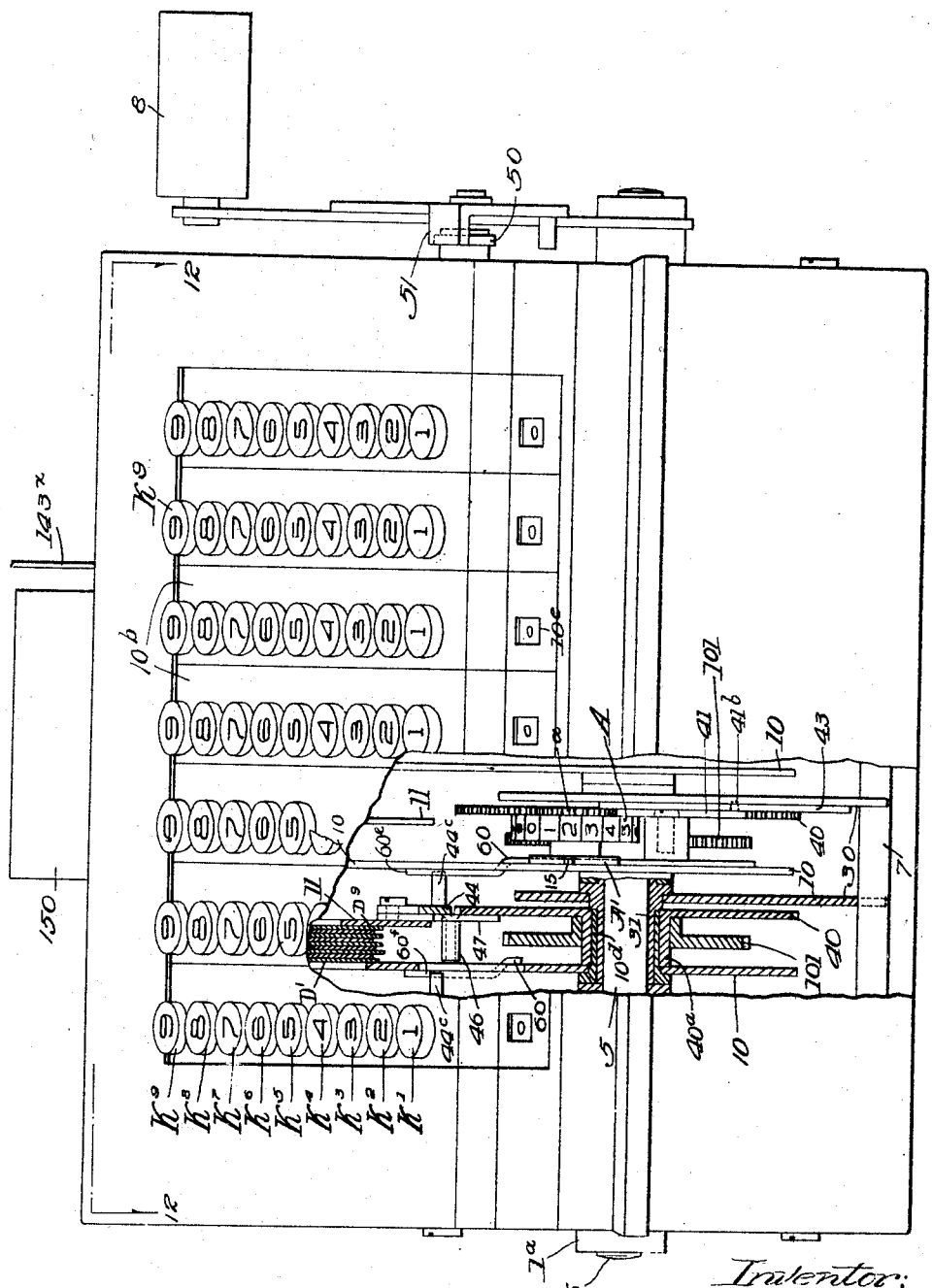

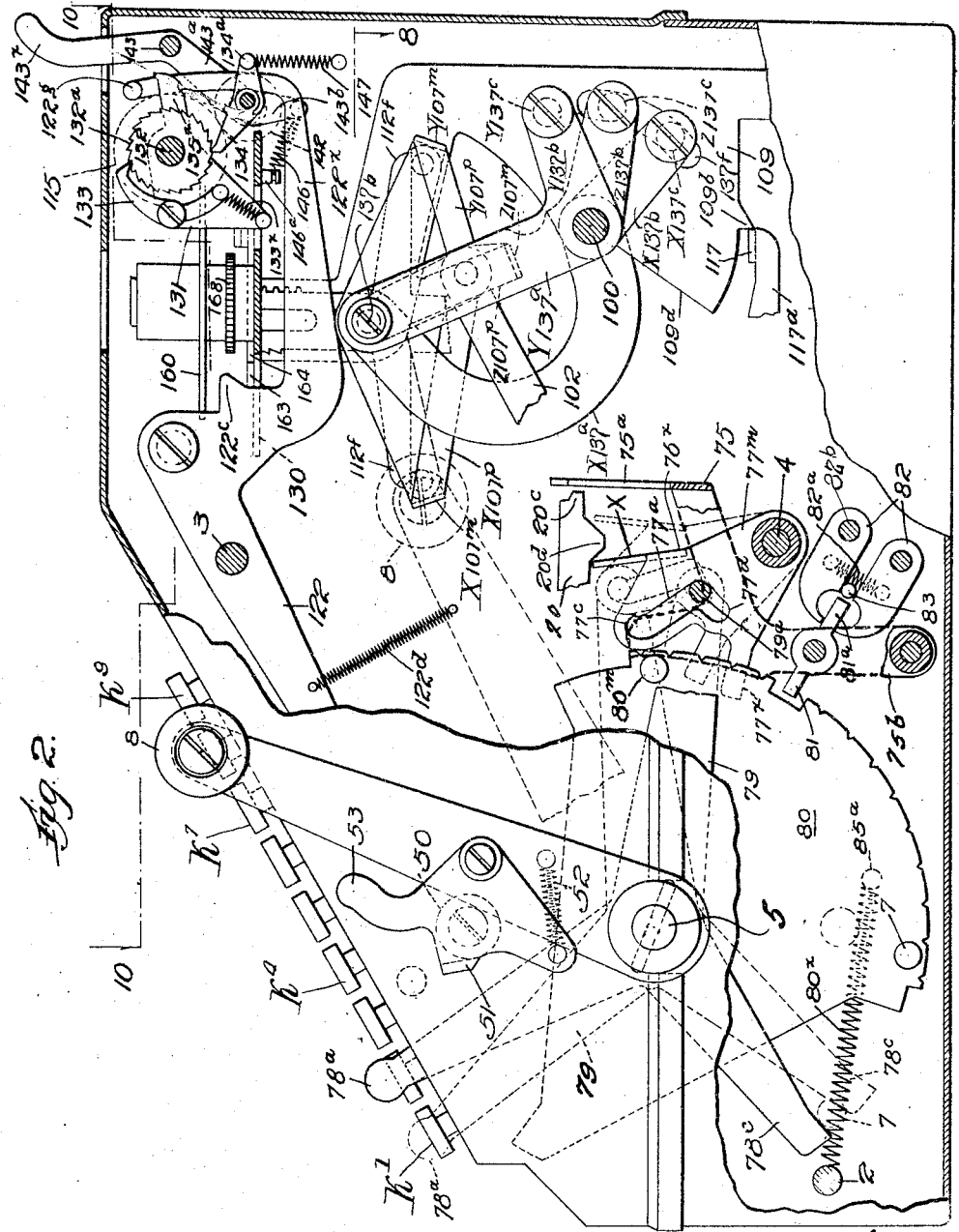

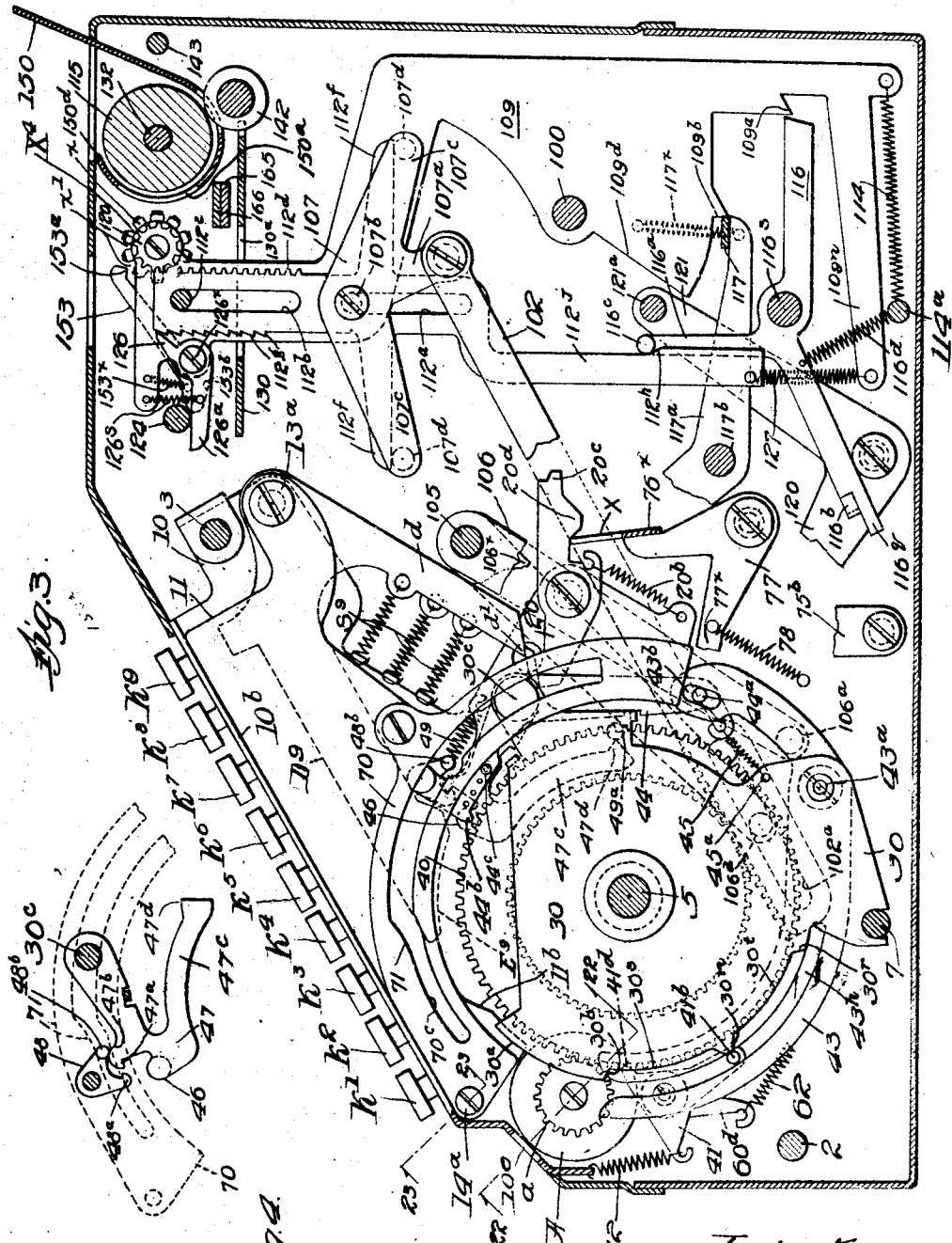

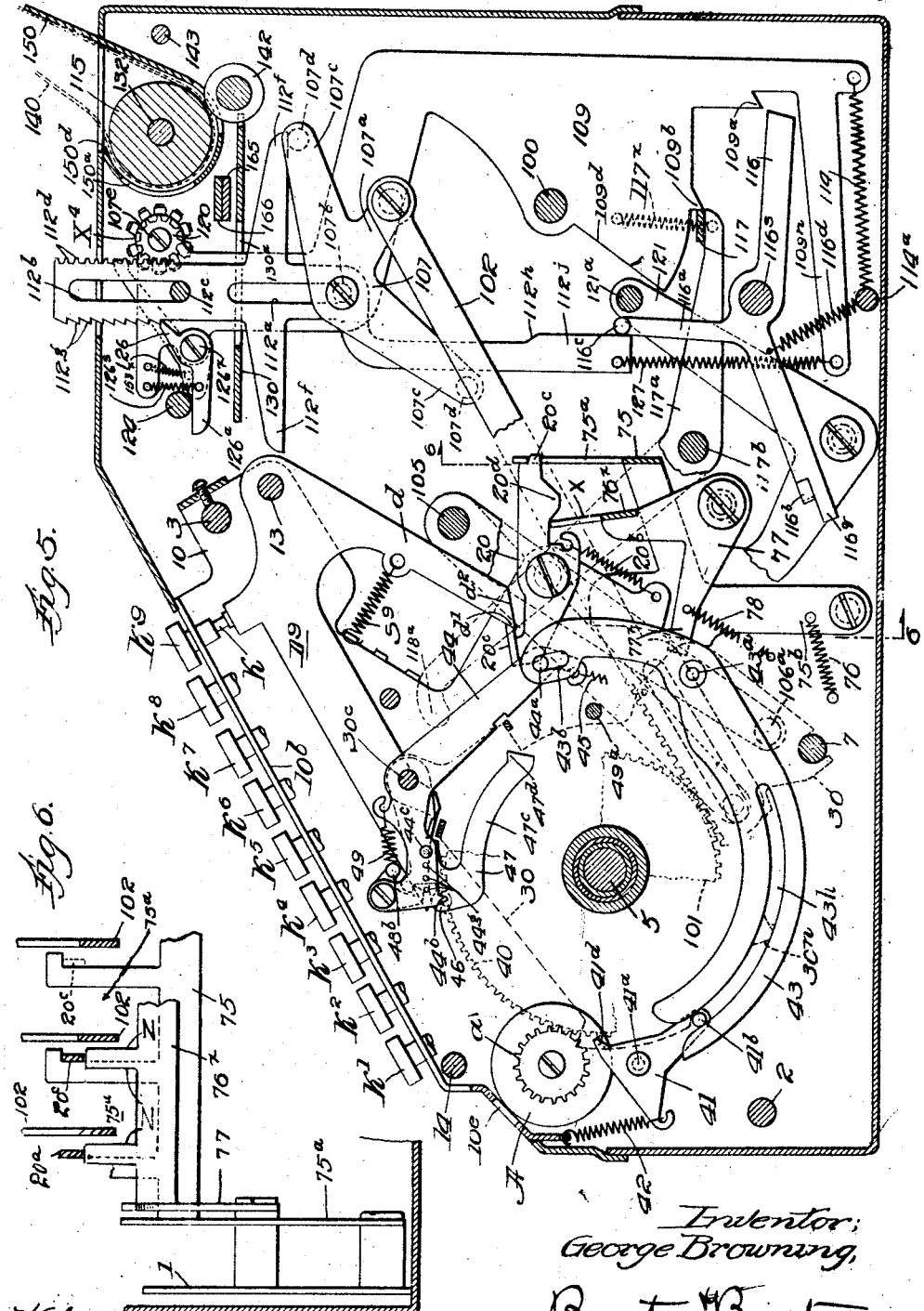

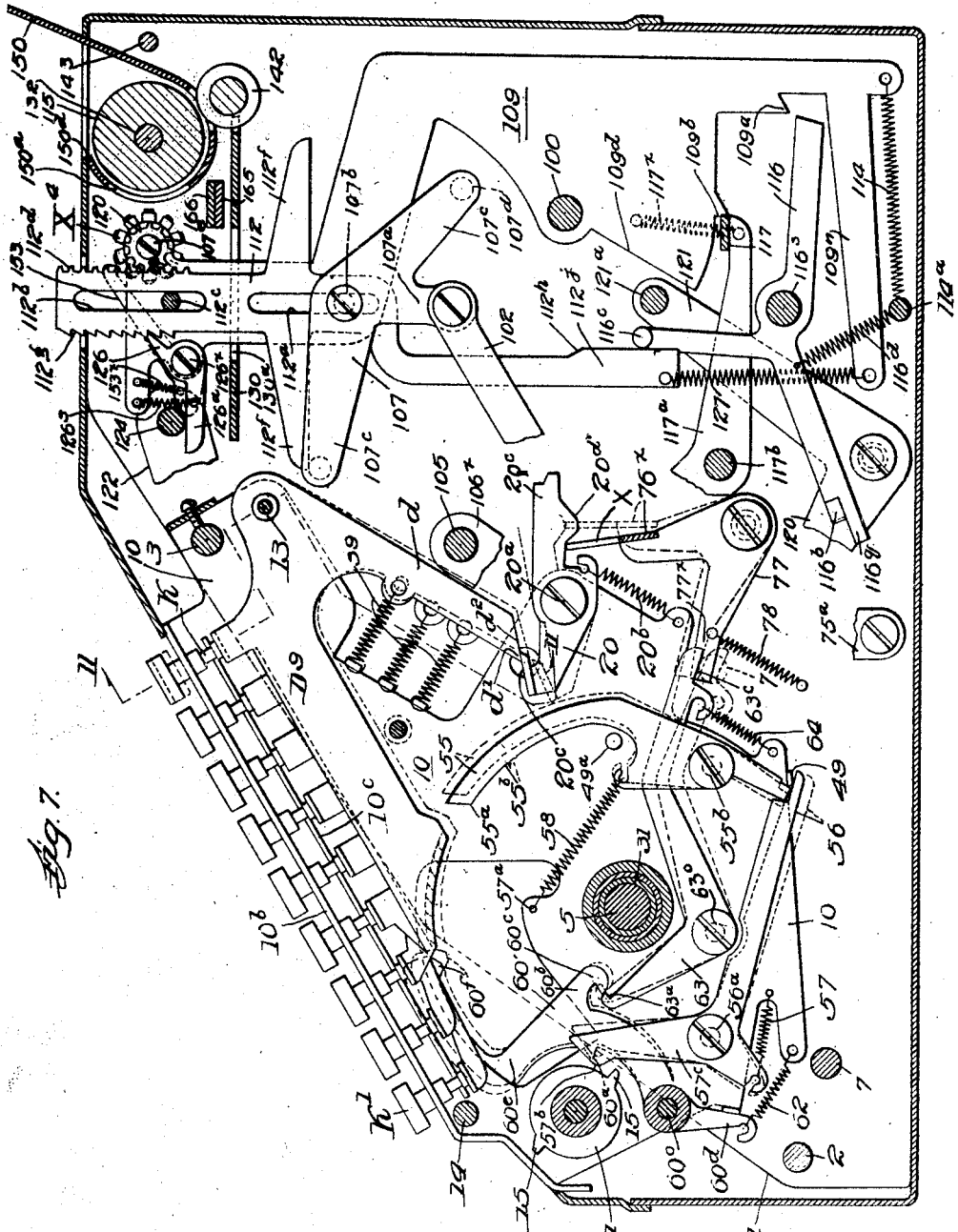

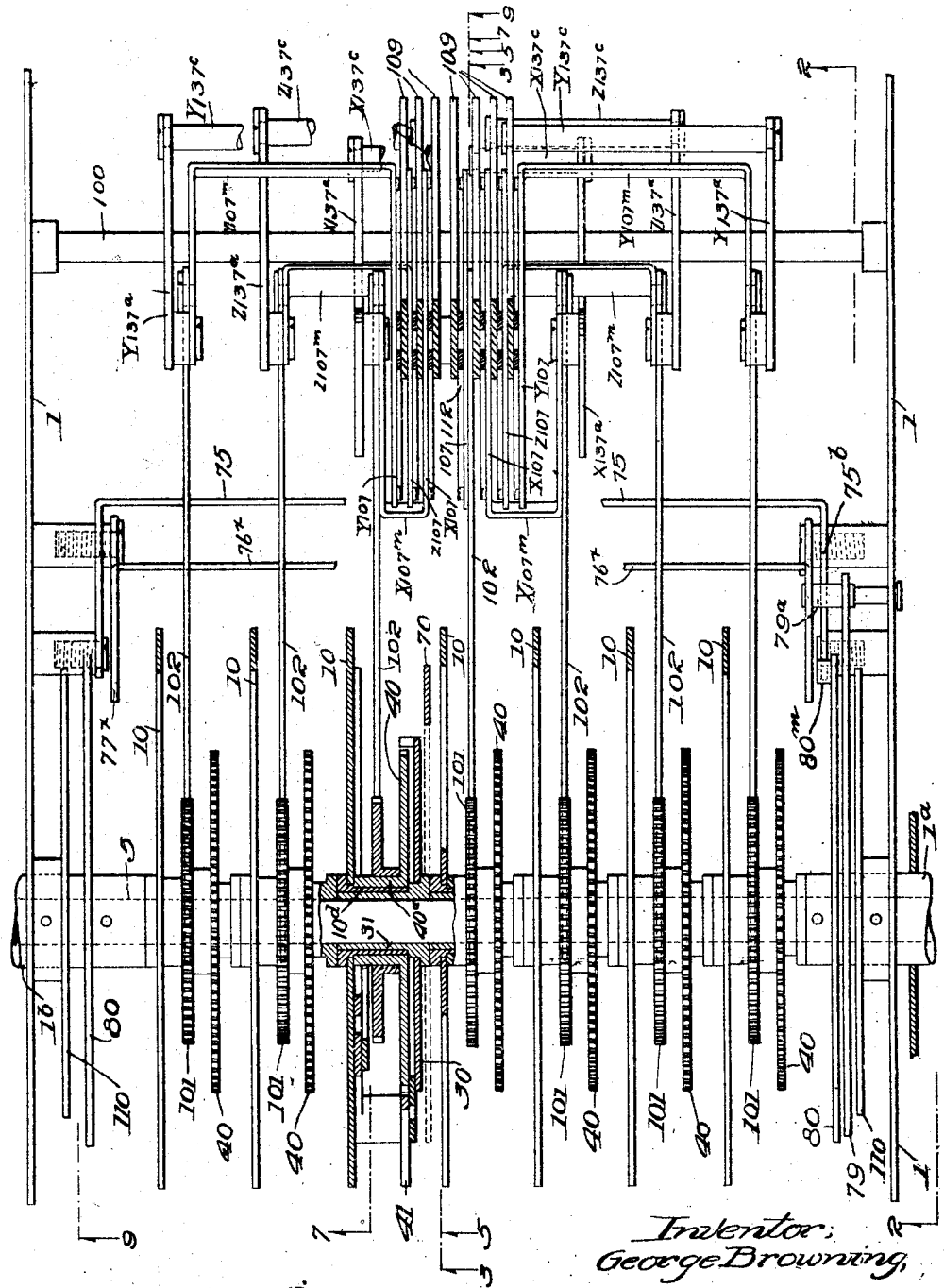

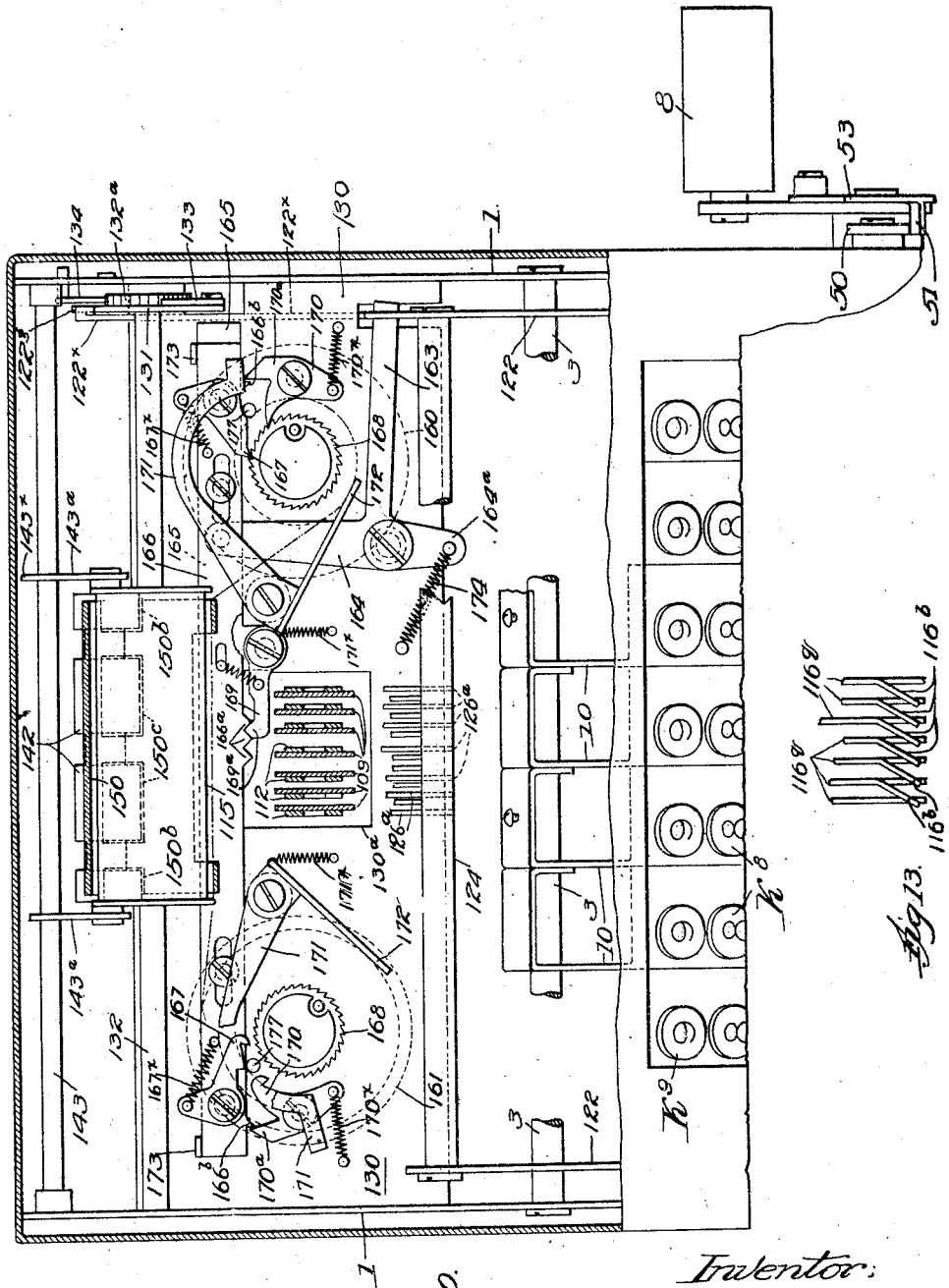

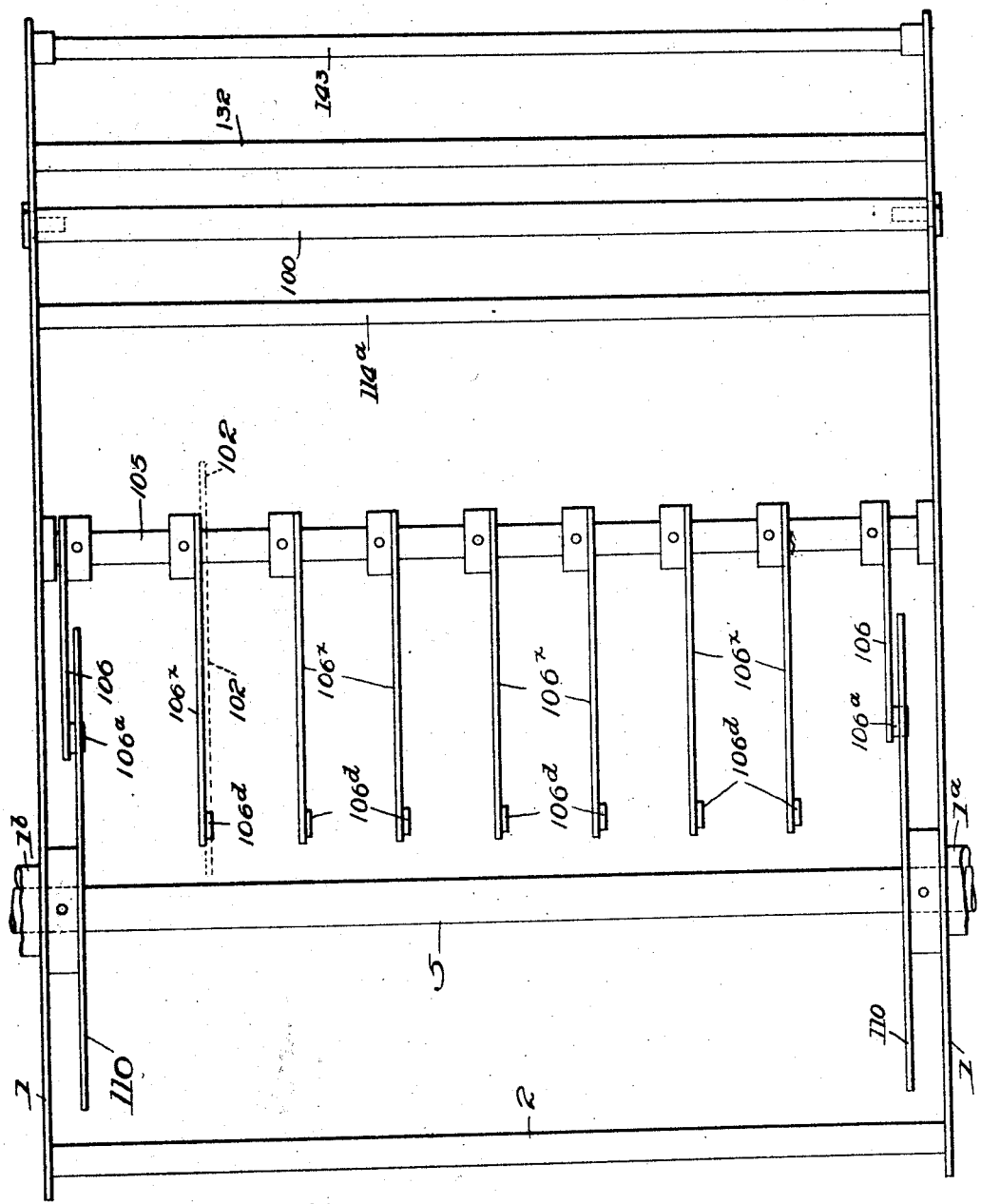

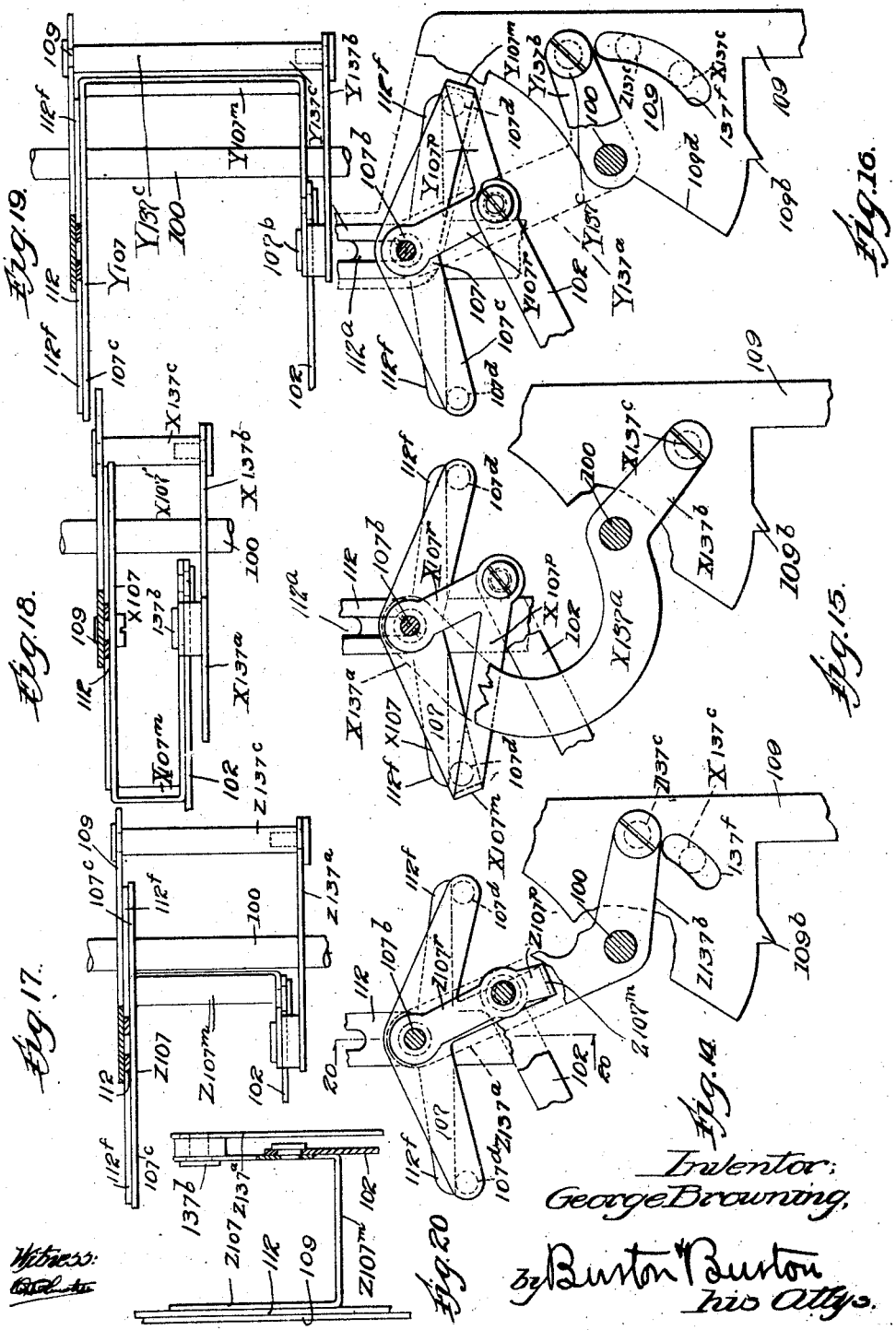

Sept. 25, 1928.                                       1,685,583
G. BROWNING
COMPUTING MACHINE
Filed Jan. 15, 1920      12 Sheets-Sheet 11

Witness:

Inventor:
George Browning,
by Burton & Burton
his Attys.

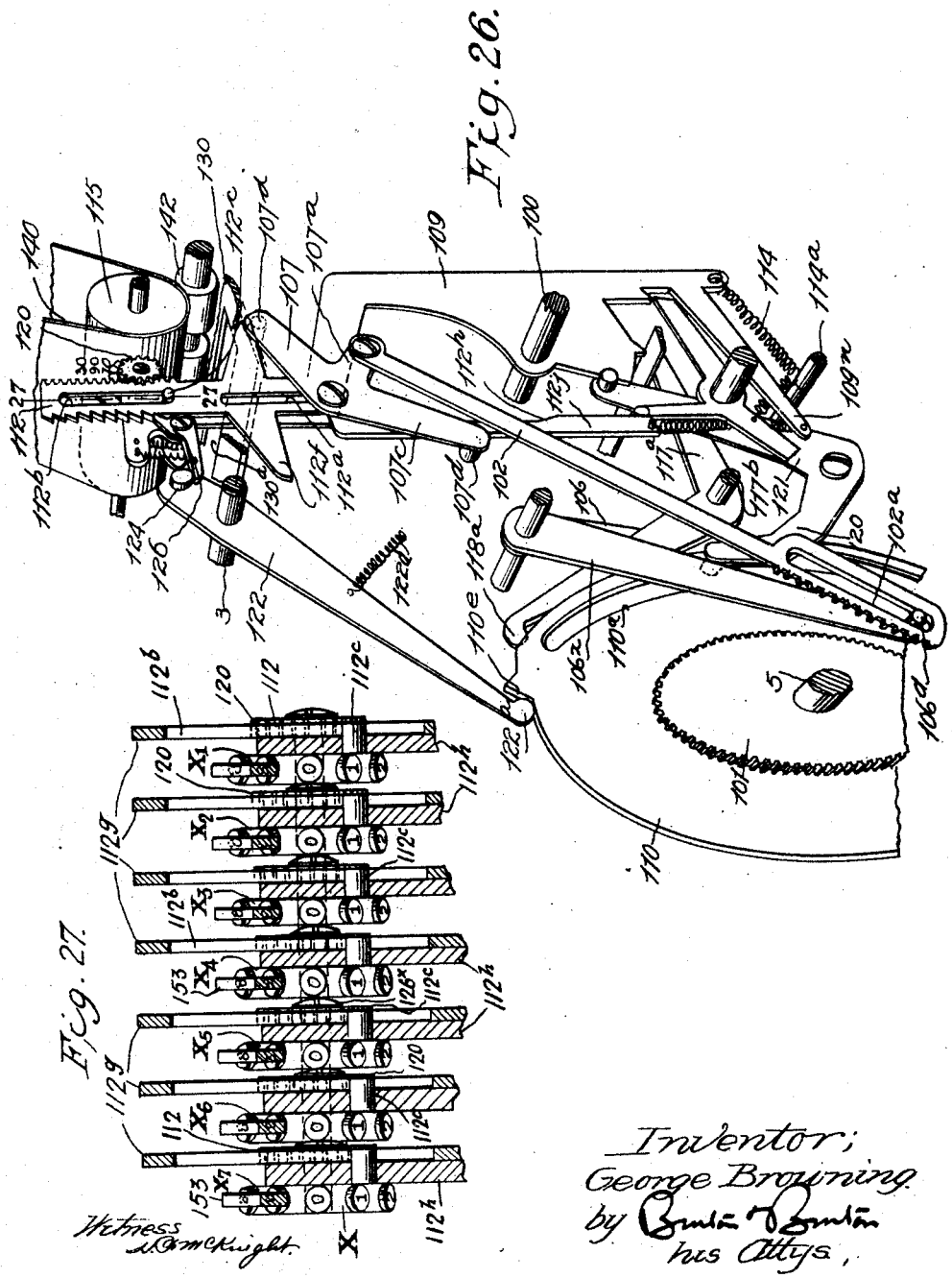

Patented Sept. 25, 1928.

1,685,583

UNITED STATES PATENT OFFICE.

GEORGE BROWNING, OF CHICAGO, ILLINOIS.

COMPUTING MACHINE.

Application filed January 15, 1920. Serial No. 351,647.

The purpose of this invention is to provide an improved key-operated mechanism for adding machines and the like, for performing arithmetical processes of which the result is to be visually indicated by the device, comprising also means for recording successive sums. It consists in the elements and features of construction shown and described as indicated in the claims.

In the drawings:—

Figure 1 is a front elevation of a machine embodying this invention having the case and some of the operating parts cut away to disclose the interior construction.

Figure 2 is a sectional right-hand end elevation of the same with the case and right hand standard partly broken away, section being made at the line, 2—2, on Figure 8.

Figure 3 is a section at the line, 3—3, on Figure 8.

Figure 4 is a detail side elevation of a certain catch or latching device in the operating connections of the master locking dog.

Figure 5 is a section at the line, 5—5, on Figure 8.

Figure 6 is a detail section at the line, 6—6, on Figure 5.

Figure 7 is a section at the line, 7—7, on Figure 8.

Figure 8 is a horizontal axial section at the line, 8—8, on Figure 2.

Figure 9 is a section at the line, 9—9, on Figure 8.

Figure 10 is a partly sectional plan view, with the lower forward part broken away, section being made at the line, 10—10, on Figure 2.

Figure 12 is a section at the line, 12—12, on Figure 1, showing the supporting frame construction comprising end plates and tie rods or shafts between them.

Figure 13 (Sheet 8) is a detail elevation showing interlocking fingers of certain levers concerned in carrying from column to column in the recording mechanism.

Figures 14, 15 and 16 are detail side elevations of the several differential and offset transmitting devices for actuating the numeral printing wheels for the noncentral column.

Figures 17, 18 and 19 are plan views of the structure shown in Figures 14, 15 and 16 respectively.

Figure 20 is a section at the line, 20—20, on Figure 14.

Figure 25 (Sheet 7) is a detail fore-and-aft section showing in side elevation a printing wheel detent device in its relation to said printing wheel.

Figure 26 is a perspective view of the printing wheel carrying and operating parts.

Figure 27 is a sectional detail front elevation showing the numeral printing wheels, section being at line 27—27 on Fig. 26.

Figure 23:
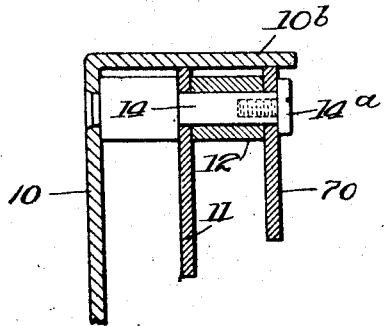
Figure 23 is an enlarged detail section at the line, 23—23, on Figure 3.

The instrument shown in the drawings comprises a plurality of individual column adding mechanisms mounted side by side on a common shaft which is supported in fixed standards rigidly secured together by said shaft, as well as the other means particularly pointed out. Each of the mechanisms comprises a series of digit keys from 1 to 9 inclusive; a number wheel having on its periphery a double series of figures from 0 to 9 inclusive, 20 in the total circumference, as designed to be indicated by the angular or sectoral diagram shown of the side of one of said wheels on Figure 1; mechanism by which the depression of the digit keys and the subsequent operation of the rotating means causes the number wheels to be rotated in advance direction with respect to their number series, a number of steps corresponding to the key depressed, and means by which each succeeding mechanism is actuated by the preceding one for carrying tens.

The main frame, or frame in common of the entire group of column adding mechanisms comprises two end standards, 1, 1, and transverse rods, 2, 3 and 4, (Figs. 2 and 8) spacing them apart and connecting them together rigidly. On the end standards there is journaled in bosses, 1ª, 1ᵇ, (Figs. 8 and 12) with which they are respectively provided, a main central shaft, 5, which extends through all the column mechanisms and constitutes a means for operating them for adding and clearing, as hereinafter described.

The several column mechanisms are all alike except that the unit column mechanism lacks the actuated element and the final column element lacks the actuating element, for carrying; and description of one of these mechanisms will answer for all of them.

Figure 11:
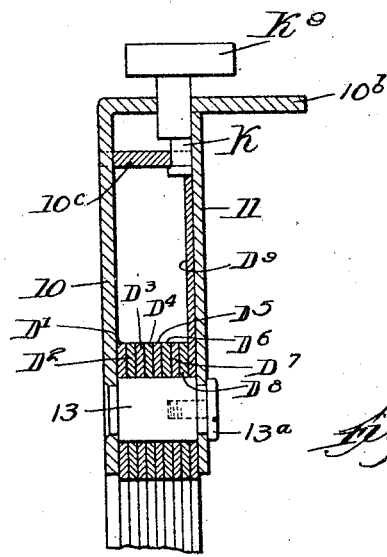
Figure 11 (Sheet 11) is a section at the line, 11—11, on Figure 7, showing the number-determining cams.

Each of the mechanisms comprises a frame consisting of a main plate, 10, and an auxiliary plate, 11, (Figure 1) said plates being secured together and spaced apart by shouldered posts, 13 and 14, (Figures 11 and 23) riveted rigidly in the main plate and bored and tapped at their ends for screws, $13^a$, $14^a$, which secure the auxiliary plate thereon against the stop shoulders, a second spacer, 12, being interposed on the post, 14, for spacing off from the auxiliary plate another part hereinafter mentioned. The main plate, 10, is flanged at an upper oblique edge to form the upper forward inclined wall of the frame and the bearing of the digit keys or numeral keys, as hereinafter described; and said flanges, $10^b$, (Figures 5 and 7) all together constitute the keyboard and substantially close, at the upper forward side, the frame-in-common of the entire group of column mechanisms, when they are all assembled side by side in said frame-in-common. Parallel to the flange, $10^b$, of each of these frames there is mounted rigid with the plate, 10 a bearing plate, $10^c$, which affords a second bearing to each of the stems, K, of the numeral keys, $K^1, K^2, K^3, K^4, K^5, K^6, K^7, K^8$ and $K^9$, having their stems extending through the plate, $10^c$, for actuating the cam levers hereinafter mentioned.

Figure 22:
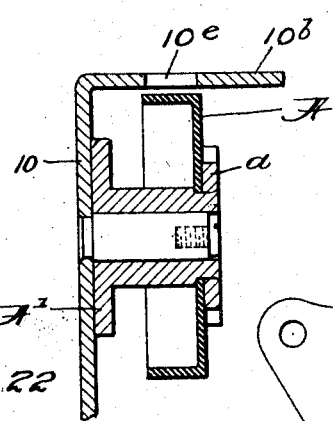
Figure 22 is a section at the line, 22—22, on Figure 3.
Figure 21:
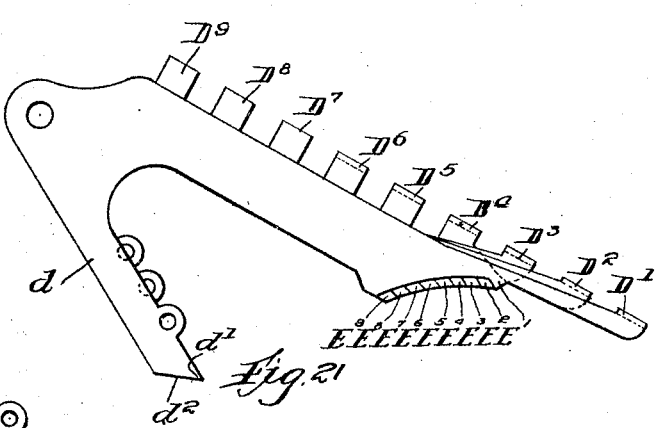
Figure 21 is a left hand side elevation of the entire group of digit-key-operated cam levers.
Figure 24:
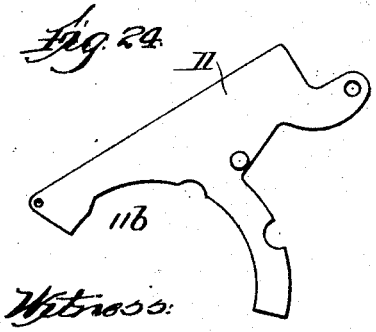
Figure 24 is a detail side elevation on a reduced scale of one of the fixed plates constituting the frame work of each column mechanism.

In the frame defined by the plates, 10 and 11, there are mounted between said plates the key-operated number-determining-cam levers, $D^1, D^2, D^3, D^4, D^5, D^6, D^7, D^8$ and $D^9$, (Figures 11 and 21) which are all fulcrumed on the tie-rod, 13. Each of these cam levers comprises an arm, $d$, extending from the fulcrum at an acute angle to the key-actuated arm, which is parallel to the flange, $10^b$, and to the bearing bar, $10^c$, below the latter, and thereby is in position for receiving the thrust of the stem, $k$, of the keys, $K^1$–$K^9$. For holding the cam levers with their cams in abutment-encountering position when they have been respectively moved in by the inthrust of the keys, there is provided a latch, 20, (Figures 3 and 7) fulcrumed at $20^a$, and provided with a spring, $20^b$, pressing it toward the ends of the arms, $d$, of the levers, $D^1$–$D^9$, said latch being adapted to overhang and engage the acute-angled corner, $d^1$, of all of said levers, that is, said lip or nose extending across the entire group of lever ends. This lip is itself acute-angled having its outer face, $20^c$, parallel with the flush end, $d^2$, of said levers, and bearing against them as seen in Figure 7. The arm, $d$, of each camlever, $D^1$, etc. is urged forwardly by a spring, $S^9$, said springs being attached to lugs on a frame-plate, 10. Wherever any lever is operated by the key so as to swing downward the arms, $d$, it will be seen that the beveled end, $d^1$, of that particular lever will crowd the lip of the dog, 20, back away from the flush ends of the remaining levers, and that upon the acute-angled corner of the lever arm which is being actuated passing by the acute angle of the lip of the latch, the dog will react and engage said acute angle, holding the lever in the depressed position, the dog being again stopped against the flush end of the remaining levers. From this construction it will result also that one lever having been depressed by its key and engaged, as described, by the latch when another lever is similarly depressed, the latch will be forced back by the last depressed lever, as it was by the first, and thereby the first depressed lever will be released while the last depressed lever will be engaged. Thus the actuation of any key by the operator will release the lever previously actuated by another key, and the first actuated key will be returned to its normal position. The key-operated arms of the levers, $D^1$–$D^9$, have projecting from their lower edges, cam protrusions, $E^1$–$E^9$, (Figure 21) respectively, which are of graduated length to extend along the edges of said levers, the length of the cam protrusion on each lever being proportional to the numeral of the key which operates that lever. The purpose of these cam protrusions is to force the operative engagement throughout determined and graduated portions of the total stroke of the operating handle of the mechanism for rotating the number wheel for adding. This number wheel is a short cylinder having on its periphery two series of numerals from 0 to 9 (Figure 1) said periphery being sub-divided into spaces, each hereinafter called a unit space or unit step. Said numeral wheel or number wheel is mounted on the plate, 10, in position to expose its periphery having the numeral at the reading aperture, $10^e$, (Figures 1 and 5) of the flange, $10^b$. Rigid and concentric with the numeral wheel on one side of it is a pinion, $a$ (see Figures 3, 5 and 22), having twenty teeth, and on the opposite side a ratchet cam disk or plate, $A^1$, having at diametrically-opposite points, aligned longitudinally of the cylinder with the zero spaces of the periphery, two cam ratchet teeth, 15, 15 (Figures 1 and 7). On the shaft, 5, there is mounted for rocking therewith, an operating plate, 30, (Figures 1 and 3) having a sleeve-hub, 31, for securing it on the shaft and affording journal bearing for a similar hub, $10^d$, rigid with the plate, 10; and journaled on said last mentioned hub and thereby journaled about the shaft, 5, is a master gear wheel, 40, having a hub, $40^a$, journaling it and positioning it as to spacing, between the plates, 10 and 30. This gear is meshed with the pinion, $a$, and the mode of operation of the mechanism involves the rotation of the pinion and the numeral wheel when the master gear is rotated, and to the extent of such rotation at the successive operations for adding. All the plates, 30, of the several column mechanisms are connected together for simultaneous operation, by a rod, 7, which extends parallel to the shaft, 5, outside the master gears, 40, for performing certain operations hereinafter described. The details of each of the column mechanisms will now be described.

41 (Figures 3 and 5) is a locking dog fulcrumed at $41^a$ on the main plate, 10, whose head engages the teeth of the master gear, 40, for locking it against rotation. A spring, 42, tends to hold the dog in engagement, and such engagement is made positive against rotation of the gear in either direction by means of a lever, 43, which has a slot, $43^h$, circumferential about the axis of the gear at what may be called the normal position of said lever. Said slot engages a stud, $41^b$, on the dog, 41, which lets the dog's head, $41^d$, into gear-locking position, when the lever is held in said normal position. The lever, 43, is fulcrumed at $43^a$ on the operating plate, 30, and extends from its fulcrum on around the axis for about 110° in one direction, for containing said slot, and for about one-third that distance in the opposite direction; and at the end opposite to that having the slot, it is engaged by means of a slot, $43^b$, with a stud, $44^a$, in a lever, 44, which is also fulcrumed intermediate its ends on the operating plate, 30, at $30^c$, and at its end opposite that having the stud, $44^a$, it terminates as a dog, $44^b$, for engaging the teeth of the master gear, 40. A spring, 45, (Figure 3) stretched for making connection at $45^a$, on the operating plate, 30, to the end of the lever, 44, as well as the spring, 42, which causes the stud, $41^b$, to press upon the lever, 43, operates to hold the dog, $44^b$, normally out of engagement with the teeth of the gear, 40. The dog lever, 44, carries an abutment, 46, which is rendered movable with respect to the dog lever by being carried on a lever, 47, pivoted to the dog lever. A spring-actuated latch, 48, (Figures 3 and 4) having its spring, 49, extending from it to the dog lever, 44, engages the lever, 47, by means of a catch hook, $48^a$, on the latch, 48, co-operating with a catch hook, $47^a$, on the abutment-carrying lever, 47, to lock the lever, 47, at a certain position on the dog lever, 44, for holding the abutment, 46, at desired position for encountering the determining cams, $E^1$-$E^9$, above described. The dog, 41, locks the master gear to the fixed frame plate, 10; and the dog lever, 44, locks the operating plate to the master gear. These two dogs may therefore be referred to respectively as the master gear locking dog, and the operating plate locking dog. It is essential to the mode of operation of the structure that the operating plate should be locked to the master gear when the master gear is unlocked from the fixed frame plate, 10, and vice versa, —that the operating plate should be unlocked from the master gear when the master gear is locked to the fixed frame plate; and the above described connections of the parts secure this result.

It will be observed that the stud, $41^b$, of the dog, 41, projects not only through the slot of the lever, 43, but also through the thickness of the operating plate, 30; and that plate is therefore necessarily cut to afford a path for the stud in the rocking of the plate. But it is important that the movement of the dog, 41, for releasing the master gear, 40, shall be positively prevented at certain parts of the operating movement and rest position of said plate; and for that purpose the edge of that plate which is in general cut in an arc about the axis of its operating movement, has the segment, $30^a$, at one end of such arc, and the short segment or tooth, $30^n$, and the short segment or shoulder, $30^r$, each shaped in the arc of a circle whose radius is the distance of the stud, $41^b$, from the axis, when the dog, 41, is in gear-locking position; and the segments, $30^s$ and $30^t$, respectively, between the segments, $30^a$, and the segment, $30^n$, and between the segment $30^n$, and the segment, $30^r$, are cut back to a radius permitting the stud to move into gear-releasing position of the dog. The specific functions of these several protruding and receding segments will hereinafter appear.

The purposes and functions of certain details of the parts already described and of others which are minor or secondary parts of the invention, will be best understood in considering the operation of the mechanism already described.

A certain portion of the angular or rocking movement of the operating plate, 30, is for giving the rotation for adding to the number wheel, A. A further portion of said movement in the same direction is for the carrying action, which has not yet been described. It is essential that this movement once begun shall be completed; because otherwise there would be no certainty of the addition or carrying having been performed. Means are provided, hereinafter described, for preventing return rocking movement of the plate, 30, from any point intermediate the starting position or position of rest to the end of the carrying stroke; and a further increment of that stroke is appropriated to releasing the back-stroke-preventing means. Obviously provision is necessary for insuring disengagement of the number-wheel-actuating train from the operating plate, during the return stroke to rest position, since otherwise the number wheel would be reversed as far as it is advanced in each action, and no adding would result. Means for such disengagement will be hereinafter described.

The operation for clearing the sum,—that is, returning the number wheels to zero, is effected by rocking the operating plates from rest position in the opposite direction from that in which they are rocked for adding; and provision is necessary for engaging the number-wheel-operating trains in such rocking of the plates backward from rest position. These features and connections will be hereinafter described.

For stopping the operating handle, 8, at the rest position of the operating plate, 30, so that in the return movement after adding it shall not be liable to be carried back, causing a clearing of the sum, there is mounted on the outer side of the right-hand-end standard, 1, a stop, 50, (Figures 1 and 2) and the lever handle, 8, has a latch, 51, which at normal position encounters said stop in the return stroke of the handle after the adding stroke. A spring, 52, operates for holding the latch at the normal or rest position of the handle lever, 8. For clearing, the operator presses the lever, 53, of the latch, 51, while pressing rearward on the handle lever, 8, and swings the latch clear of the stop, 50, so that the handle may be swung over rearward through the necessary arc for clearing. In this clearing process also, it is essential that the stroke shall be completed when once begun; and devices for insuring this result will be described. The spring, 52, permits the latch to ride back over the stop in swinging the handle back to rest position after clearing.

The operation of the device up to a certain stage may now be considered.

The parts being at rest position, the operator depresses the digit key of the number to be added, for example, the key, K⁹, for adding, 9, (see Fig. 5). This forces the cam lever, D⁹, to latched position,—that is, with its acute-angled end, d¹, engaged by the latch, 20. The operator now swings the operating handle down forward through an initial portion of the stroke, which in the case of the numeral, 9, is only a distance corresponding to one tooth of the master gear. The master locking dog, 44, swings over the master wheel without engagement therewith, until the abutment, 46, encounters the cam projection, E⁹, and is forced inward carrying the dog, 44ᵇ, into engagement with the master gear so that the master is rotated during the succeeding movement, until the abutment runs off the cam projection. It will be remembered that the connection of the levers, 43 and 44, at the slot, 43ʰ, causes the dog, 41, to be disengaged from the master gear when the dog head, 44ᵇ, is engaged with that gear; and the reverse occurs when the abutment, 46, runs off the cam. That is, the dog, 41, reengages the gear and holds it, thus preventing any overthrow of the gear and consequent overaddition at the number wheel.

All the cams, E¹–E⁹, terminate at the same transverse line, so that the end of the feeding action is the same for all cases. The initial point, however, varies according to the number to be added, but the adding stroke does not terminate at the end of the cam, because the carrying action is yet to be effected. The means for this purpose will now be described.

The carrying of one (1) from each column to the next succeeding column upon the completion of the tenth step of rotation of the pinion and numeral wheel of the mechanism corresponding to the column from which the carrying is to be done, is effected by means of the lever, 60, (Figures 1 and 7) fulcrumed at 60°, on the frame plate, 10, and having a cam ratchet tooth, 60ᵃ, positioned for encounter with the cam ratchet tooth, 15, on the disk, A¹, which is carried by the numeral wheel, A, or as a part thereof, such tooth, 15, occurring, as already stated, at each tenth numeral space of the numeral wheel. A spring, 62, connected to the arm, 60ᵈ, of the lever, 60, operates to hold the lever in position for encounter of its tooth, 60ᵃ, with the tooth, 15, when the latter comes around; and said lever, 60, has an arm, 60ᵇ, provided with a hook nose, 60ᶜ, for engagement of which there is provided a latch, 63, fulcrumed at 63°, on the frame plate, 10, and provided with a spring, 64, tending to engage the hook nose, 63ᵃ, of the latch with the hook nose, 60ᶜ, of the lever, 60, when the last mentioned lever is moved about its fulcrum by the encounter of the tooth, 15, with the tooth, 60ᵃ, so as to swing the point of the tooth 60ᶜ down outside the tooth, 63ᵃ,—that is, away from the position shown in full line in Figure 7, to the position shown in dotted line in that figure, the latch, 63, being upon that change of position of the lever, 60, actuated by the spring, 64, from the position shown in full lines in Figure 7 to the dotted line position shown in said Figure 7.

Thereupon the lever, 60, is retracted slightly to the position shown in full line Figure 7 and the tooth, 60ᵃ, is protruded again in the path of the tooth, 15, sufficiently for locking engagement of said teeth upon reversal of the wheel, A. The lever, 60, has an arm, 60ᵉ, which is deflected out of the plane of the remainder of the lever, so as to stand upon the opposite side of the plate, 10, (see Figure 1) from that at which said lever is mounted, and at the end of this arm, 60ᵉ, it is provided with a cam projection, 60ᶠ. The dog lever, 44, (Figures 1 and 5) is provided with a pin or stud, 44ᶜ, constituting an abutment projecting to the right (Figure 1) and into the path of the cam projection, 60ᶠ, of the next preceding mechanism. For the purpose of positioning the abutment, 44ᶜ, properly on the dog lever, 44, in the several mechanisms, said dog lever in each mechanism is provided with a series of holes, 44ᵍ, one less in number than the number of column mechanisms said holes being in the dog lever disposed in the arc of a circle about the axis of the operating plate and shaft, and spaced one step from each other; and the abutment pin, $44^c$, for the second mechanism is mounted in the first of these holes,—that is, the one nearest the end of the dog lever; in the third mechanism the pin is mounted in the second hole, and so on, the last mechanism having the pin mounted in the last hole; so that the encounters of the cam abutments, $60^f$, with the abutment pins, $44^c$, will occur successively one step apart in the rocking movement of the operating plates, 30; and the arm, $60^e$, of the lever, 60, is dimensioned so that the encounter of the cam abutment, $60^f$, of the first mechanism with the abutment pin, $44^c$, of the second, will occur in the first step of the movement of the operating plate, 30, after the stud, $41^b$, on the dog, 41, (for which a path in the first part of the rocking movement of the operating plate has been provided along the recessed segment, $30^s$, at the periphery of the plate, 30,) has reached and climbed the shoulder of the segment, $30^a$, that is, at the conclusion of the adding movement, which terminates, as described, with the locking engagement with said dog, 41, in the master gear and the releasing of the master gear from the dog lever, 44. In the first step of the movement beyond this point, therefore, it will be seen that the cam projection, $60^f$, of the first mechanism will be holding the dog lever, 44, of the second mechanism engaged with the master gear of said second mechanism, so that the pinion, $a$, of the numeral wheel, A, and said numeral wheel, of said second mechanism will be rotated one step, thus adding one (1) to the indication by carrying from the preceding mechanism. The angular extent of the projection, $60^f$, corresponds to one step and therefore only one (1) will be carried in such operation; and this will occur only if during the preceding adding movement of the numeral wheel of the first mechanism that numeral wheel has been rotated past the zero point, so that the tooth, 15, of that numeral wheel has encountered the tooth, $60^a$, of the lever, 60, and has moved that lever to the position shown in dotted lines in Figure 7, where it is locked by the latch, 63, as described, thereby carrying the cam projection, $60^f$, radially inward to the path of the subsequent rocking movement of the operating plate to bring it into encounter with the abutment pin, $44^c$, on the lever dog, 44, of the next column mechanism. Similarly, in each succeeding step of the operating plate movement in the same direction, a carrying will be effected from any mechanism whose numeral wheel during the adding movement plus the carrying movement derived from the preceding mechanism, has been brought to or past the zero point; and the reason for positioning the abutment pins $44^c$, in the successive mechanisms each one step beyond the position in the preceding mechanism, is to give to each mechanism the benefit of any carrying which may come to it from the preceding mechanism before its own carrying action upon the next following mechanism is performed.

For releasing the lever, 60, from the latch, 63, at the limit of the carrying movement, there is provided a bar, 7, connecting the operating plates, 30, of all the mechanisms and extending along behind the entire group, which is positioned to encounter the tail, $63^c$, (Figure 7) of the latch, 63, which extends rearward for that purpose, in the last increment of the rocking movement of the operating plate in the direction of adding and carrying.

When the carrier has been rocked to the limit and is to be rocked back again to initial position, provision must be made for preventing its reverse action from reversely actuating the number-wheel. Since the cam which has been pressed for adding still remains depressed prevention of the reverse rotation must be effected by disconnecting the abutment, 46, from the dog lever, 44, or rendering its connection ineffective for carrying the dog into engagement with the master in this reverse movement; and it is with a view to this necessity that the said abutment, 46, is made movable on the lever dog, 44, by being mounted on the carrying lever, 47, (Figures 4 and 5) and locked in operative position by the latch, 48, as described. For the purpose of thus releasing the abutment, 46, before the reverse movement of the operating plate, 30, is begun, there is mounted rigidly with respect to the fixed frame plate, 10, most conveniently on the posts, 13, and 14, a slotted cam plate, 70, (Figures 3 and 4) having a cam shoulder, 71, which operates by encountering a pin, $48^b$, which projects from the latch, 48, to rock the latch and disengage the catch hook, $48^a$, from the catch hook, $47^a$, of the lever, 47, said cam shoulder, 71, being positioned so as to encounter the pin, $48^b$, at any time in the carrier's movement after the completion of the adding movement,—that is, after the shoulder, $30^b$, of the operating plate has passed the latch, $41^b$, of the dog lever, 41. The edge, $70^c$, running from the cam shoulder, 71, is concentric with the operating plate, 30, so that after said cam shoulder has encountered the pin, $48^b$, for disengaging the catch, the pin riding along said concentric edge of the slot holds the catch disengaged through the remainder of the movement of the operating plate. The latch, 48, has a short lever arm carrying the pin, $48^b$,—the latch being in bell-crank-lever form,—which in the swinging movement of said latch for disengaging the catch hooks of the lever, 47, and latch, 48, strikes the edge of the lever, 47, and swings it to carry the abutment, 46, positively out of the path of encounter with the cam projections E¹–E⁹ of the cam levers which have been operated by their digit keys; and thereby the return movement of the operating plate is effected with the master gear unlocked from said operating plate, and therefore without giving the master gear any reverse rotation. The abutment carrying lever, 47, has an extension, 47ᶜ, projecting back (with respect to the direction of the adding movement of the operating plate, 40), from the abutment, 46, which extension has a beveled end, 47ᵈ, which in the last step of the return movement of the operating plate, 30, to rest or initial position, encounters a stud, 49ᵃ, (Figure 5) mounted in the plate, 10, and by this encounter the lever, 47, is moved for carrying the abutment, 46, back to the position which it should occupy on the dog lever, 44, in order to co-operate properly with the key-operated cam; and said lever, 47, is locked in that position by the automatic operation of the latch, 48, and the parts are thereby properly located for the next adding movement of the operating plate. Also at the same time for positively insuring the removal of the abutment, 46, out of position for encounter with the cam projection in the return stroke, the plate, 11, (Figure 3) has a projection presenting a cam shoulder, 11ᵇ, in the path of the abutment, 46, after the carrying steps, which cam shoulder forces the abutment inward so that it will clear the cams in the return stroke.

For the purpose of preventing any change in the number being added occurring by accidental touch upon any digit key while rocking the operating plate for adding, there is provided a locking bar, 75, (Figures 2 and 5) which extends along past all the column mechanisms at the rear side, said bar being carried by lever arms, 75ᵇ, which extend down along-inside the standards, 1, 1, and are pivoted at their lower ends to said standards respectively. A spring, 76, connected to one of said lever arms and to a connection on the adjacent standard, operates for normally holding the bar, 75, in position overhanging rearward extensions or tails, 20ᶜ, with which the latches, 20, are provided. For accommodating certain vertically oscillating fore-and-aft extending parts hereinafter described this bar, 75, has vertical slots, 75ᵃ, rendering it comb-form as may be understood from Figures 5 and 6. An abutment, 80ᵐ, (see Fig. 8) on a segment plate, 80, (Fig. 8), which is primarily provided for a different purpose more particularly hereinafter described, encounters the right-hand lever arm, 75ᵇ, in the back swinging movement of the operating plate to rest position, and in the last increment of that movement swings the locking bar, 75, back, off from locking position with respect to the tails, 20ᶜ, of the latches, 20, leaving said latches free to act as already described for releasing the cam levers, K¹–K⁹. (See also Figure 2.)

But upon the movement of the rocking arm or handle, 8, in direction for adding away from the position of rest a distance less than sufficient to rotate the number wheel one step, said abutment, 80ᵐ, withdrawing from the lever arm, 75ᵇ, permits the locking bar, 75, to come into locking position overhanging the tails, 20ᶜ, of said latches; and during the remainder of the adding movement of the operating plate the dogs are held in position preventing the depression of any digit key a sufficient distance to produce any operative intrusion of the number-determining cam in the path of the abutment, 46.

It will be understood that in adding a number comprising digits in the several column mechanisms, the operator will in each column mechanism depress the keys corresponding to the digits belonging to that column, performing this process in all of the column mechanisms before any movement of the operating handle is made to rock the operating plates for adding; but when the proper keys have been depressed in all of the column mechanisms, he will operate the handle and swing all of the operating plates from rest position to the limit of the adding movement and carrying, and then return to rest position.

In the absence of means to the contrary, all the keys which have been depressed, remain depressed throughout this adding action and carrying, the corresponding cams remaining protruded in the position for encounter of the abutments, 46, of the several mechanisms with the depressed cams; and repetition of the adding operation,—that is, swinging the operating handle from rest position down to the limit and then back in the reverse direction to rest position,—will repeat the addition of the number originally set up, and this process, it will be seen affords a means for multiplying any number set up by any other number.

Except for multiplying or repeatedly adding the same number, the "set up" of the numeral keys should be "erased"; that is, the keys and key-operated cams should be all returned to normal position upon completing the operation of the operating plate for adding the numbers set up. This is effected automatically by the following means:

The tails, 20ᶜ, of the latches, 20, have each at their rear ends a downwardly-projecting V-shaped tooth, 20ᵈ, said V-shape being about a right angle, thus presenting a 45-degree slope at each side, front and rear. Mounted for rocking on the plates, 1, 1, there is provided a rocking frame comprising bell crank lever end plates, 77 and 77ᵐ, pivoted on the tie rod, 4, connected by a longitudinal bar, 76ˣ, which extends from end to end of the group of column mechanism, with its upper edge in position to collide with the sloping edges of the downwardly-projecting teeth, 20ᶜ, of the latches, 20, as said frame is rocked back and forth on the said tie rod 4. It will be noticed that such rocking action carrying the bar, 76ˣ, against said sloping of the teeth edges, 20ᵈ, in either direction,—that is, from rear forward or from the forward side rearward,—will swing the tails of the latches upward and the acute angled heads which engage and lock the cam levers downward, releasing the latter. A spring, 78, stretched from the lower forward edge of the bell crank lever plate, 77, downward and forward to a point of connection on the adjacent end standard, tends to swing the said rocking frame forwardly. A slot, 77ᵃ, (Figure 2) in said side bar of the frame, having its rear edge substantially parallel to the rear edge of said plate, has at its upper end a rearwardly reaching notch, 77ᶜ, and at its lower end a forwardly reaching notch, 77ᵈ. Fulcrumed on the shaft, 5, there is a bell crank lever, 79, having one arm extending rearwardly and carrying at its rear end a stud 79ᵃ, (Figure 2) which engages said slot in the plate, 77. The arc of movement of said stud as said bell crank lever is rocked over its fulcrum on the shaft, 5, being such that in swinging from the lower limit to the upper, it cams said plate rearward against the resistance of the spring, the stud 79ᵃ, becoming engaged in the notch, 77ᶜ, at the upper end of said slot, at the upper limit of said swing, thereby locking the plate and being itself locked, but not undisengageably as to the rocking of the lever itself. At the lower limit of the swing of the pin, 79ᵃ, said pin stands opposite the forwardly-extending notch, 77ᵈ, so that at that position the plate, 77ᵐ, can be rocked rearwardly to a depth permitted by the depth of said notch, 77ᵈ. The lower forwardly extending arm, 77ˣ, of each of the bell crank lever plates, 77 and 77ᵐ, overhangs the path of rearwardly-swinging movement of the operating rod, 7, which connects the several column mechanisms; and when the bell crank lever, 79, with its forwardly and upwardly extending arm, 78ᵃ, is swung back to its rearmost position, carrying the rearwardly extending arm down to the lower limit of its range of movement in the slot, 77ᵃ, the rearwardly swinging movement of the operating rod, 7, occuring in the forward and downwardly swinging movement of the operating handle for adding, causes said operating rod, 7, to collide with the forwardly-extending arm of the bell crank lever plates, 77ˣ and 77ᵐ and rock the frame backward, carrying the bar, 76ˣ, back rearward against the forward sloping edges of the teeth, 20ᵈ, of the latches, 20, disengaging the latches from the cam levers and releasing all the keys which have been depressed, so that they return to their normal positions, together with the cams which they respectively operate, thus preventing the repetition of the adding process upon repetition of the rocking movement of the operating handle without another "set up". When, however, the bell crank lever, 79, is rocked to the opposite limit of its range of movement, the up-standing arm being swung forward, carrying the pin, 79ᵃ, to the upper limit of the slot, 77ᵃ, the bar, 76ˣ is carried rearward out of range of the rear sloped edges of the teeth, 20ᵈ, and said lower forwardly projecting arms, 77ˣ of said bell crank lever plate, 77 and 77ᵐ are at the same time carried up out of the range of encounter of the operating rod, 7; so that the adding movement of the column mechanism,—the downward forwardly swinging movement of the operating handle, 8,—is without any effect to release the latches, 20, which remain locked with the rear end, $d^1$, of the determining cams which have been depressed in the set up; and such set up remains unchanged, so that repetition of the rocking movement for adding will again add the number set up. The bell crank lever, 79, has a third arm projecting downwardly and forwardly from its fulcrum, which arm is in the path of the forwardly swinging movement of the operating rod, 7, resulting from the rearward swinging movement of the operating handle for clearing the sum; and when this operation is performed, as hereinafter more particularly described, the collision of said operating rod, 7, with said forwardly projecting arm, 78ᶜ, reverses said bell crank lever from the position last described, at which the parts are in position for multiplying by repeated operations of the adding movement, swinging said lever to a position at which the bar, 76ˣ, stands forward of the teeth, 20ᵈ, and is adapted to operate the latches, 20, for releasing the number determining cams upon the completion of each adding stroke, and erasing the set up in the process of adding. The purpose and structure of this construction is, that normally, after each clearing of the sum, the apparatus is in condition for erasing the set up as soon as it is added, but not in condition for multiplying; so that if the operator desires to multiply, he will have to operate the bell crank lever, 79, by swinging its upper forwardly extending arm, 78ᵃ, down forward to the limit of its range of movement in that direction.

The above described expedient for erasing the set up automatically upon the completion of the adding stroke, is available for erasing an erroneous set up before adding, this being accomplished by operating the bell crank lever, 79, from whichever position it occupies to the opposite position, thus carrying the bar, 76ˣ, against one or the other of the oblique slopes of the teeth, 20ᵈ, of which either operates as a cam for causing the bar to be swung to disengage the latch from the set-up-determining cam, thereby erasing the set up. The bar, 76ˣ, has slots, x, to accommodate the same fore-and-aft extending parts for which the bar, 75, is similarly slotted and rendered comb-shaped as above mentioned.

The process of clearing the sum has heretofore been referred to. The means for this purpose will now be described.

Obviously the process of clearing must consist in actuating the master gear in engagement with the pinions of the number wheels in the reverse direction of that in which they were actuated for setting up for adding, some expedient being provided for causing this reverse movement to terminate with each of the number wheels at zero position,—that is, with the zero mark exposed at the reading aperture, some of the pinions being rotated through a greater and some through a less distance for this purpose. The entire movement for clearing begins at the rest position of the parts, and extends thence in the opposite direction from the adding movement,—that is, rearward, considering the operating handle, 8. It will be remembered that at the rest position, the stud, 41$^b$, of the dog, 41, stands at the protruding segment or tooth, 30$^a$, of the operating plate, 30, and the dog is thereby held positively engaged with the master gear. The reverse movement for clearing carries the segment, 30$^a$ away from the stud, 41$^b$, in the first step,—that is, in the movement corresponding to one tooth of the master wheel. This first step of reverse movement brings the abutment, 46, into contact with the forward beveled or cam end, 55$^a$, (Figure 7), of a pivoted bar, 55, which for the purpose of the action now being described may be regarded as fixed with respect to the plate, 10, being in fact locked in the position for collision of its said cam end with the abutment, 46, by being fulcrumed at 55$^b$, on the plate, 10, and stopped against the stud, 49, at one side of its fulcrum and stopped at the other side by a latch bar, 56, fulcrumed on the plate, 10, at 56$^a$, and held in latched position by a spring, 57. A spring, 58, is stretched from the pivoted bar, 55, to connection with the plate, 10, at 57$^a$, tends to hold the said pivoted bar snugly against the stud, 49, but not so as to fix it positively in that position without the aid of the latch, 56, above mentioned, said bar, 55, being, as stated, for the purpose of the action now to be described in fixed position, the collision of the abutment, 46, with its cam end, 55$^a$, actuates the dog lever, 44, in proper direction for engaging the dog head, 44$^b$, with the master gear, and this amount of movement is effected while the abutment, 46, is running on said cam end to the inner corner thereof; and at the completion of such engagement the said abutment is positioned at the beginning of the inner concentrically-curved edge, 55$^b$; and in the further rearward swinging movement of the operating handle, the abutment, 46, follows along the said inner curved edge,—curved about the axis of the rocking movement,—causing the master gears to be rotated and to rotate the pinions, a, on the number wheels, thereby rotating the number wheels in reverse direction. Such reverse rotation of each particular pinion and number wheel is arrested at the zero position of the number wheel, by the encounter of the abrupt shoulder of the ratchet tooth, 15, with the similarly abrupt tooth, 60$^a$, of the lever, 60. The latch, 56, above mentioned has an arm, 57$^c$, extending from its fulcrum in a direction approximately tangential to the ratchet disk, A$^1$, and having a tooth, 57$^b$, which overlies the ratchet tooth, 60$^a$, of the lever, 60, and is positioned for encounter of the ratchet tooth, 15, of the disk before the collision and interlocking of the two ratchet teeth of the disk and lever respectively; and by the encounter and riding up of said tooth, 57$^b$, on the ratchet tooth, 15, the latch, 56, is rocked on its fulcrum and disengaged from the pivoted member, 55, leaving the same free to swing away from the position at which it operates to stop the abutment, 46, and hold the dog head, 44$^b$, engaged with the master gear, said dog head being thus released from the positive holding of the latch bar, 56, and held only by the latch spring, 58, the pinion, a, being positively locked and thereby the gear being positively locked against further rotation, the further swinging movement of the operating plate carrying the dog lever, 44, causes the dog head to ride easily out of engagement with the master gear teeth, and to ride over them idly during the remainder of the rearward swinging movement. Thus each of the column mechanisms will have its number wheel reversed to zero and stopped, the remaining swinging movement of the operating plate in each case being an idle movement so far as the situation of the number wheel is concerned.

It is important that when a rocking movement of the operating plate of the column mechanisms in either direction has been begun, it should be completed in that direction to the limit; and this is equally true with respect to the adding and carrying movement, and with respect to the reverse movement to initial rest position, and also with respect to the further reverse movement for clearing, and to the return movement from the clearing limit to rest position. In order to insure that any of these movements which have been begun shall be completed to the limit, there is on the shaft 5, provided so as to be rocked with it in both directions, a segment, 80, (Figure 2) notched for engagement of the detent pawl, 81, the latter being pivoted on the frame and extended for its locking engagement obliquely to its lodgment on the periphery of the segment, 80. The notches are approximately right-angular and bisected by radii, and are adapted, therefore, for ratchet-wise engagement with a pawl 81, extending in either direction for such engagement. The pawl is provided with means tending to hold it normally radial to the shaft, 5, and to return it to such position from either oblique position. The segment, 80, has one notch positioned for entry of the pawl thereinto at the rest position of the locking mechanism, said notch being deep enough to permit the pawl to swing freely in its normal radial position; and at each end of the segment the latter is cut away so that the pawl can take its normal radial position. With this construction it will be seen that when the mechanism is moved from rest position in either direction, carrying the segment, 80, the pawl will trail along the notched edge of the segment engaging the notches successively against reverse rocking movement, until said movement in the direction in which the same has been begun has carried the segment beyond the pawl or to the deep notch; and thereupon, the movement being reversed will reverse the position of the pawl so that it will trail back over the notched segment in the opposite direction. Such reversal it will be seen will happen at the rest position, or at the two extremities of the segment; and the mechanism will therefore be rocked from rest position in either direction to the limit and from either limit back to the rest position; but cannot be reversed at any point in the movement between the said rest position and said limits respectively. The particular form of device provided for controlling the pawl consists of two dogs, 82, 82, trending in the same direction from their pivots $82^b$ and connected by a spring $82^a$ tending to draw their free ends in opposite directions, and to draw both dogs toward an intermediate stop pin, 83. The pawl, 81, has an arm, $81^a$, which extends between the free ends of the dogs, 82, 82, so that said pawl is normally held in radial position and comes to that position whenever there is opportunity, and is held by the spring which connects said dogs, 82, 82, pressed in inclined position in one direction or the other against the notched periphery of the segment plate.

To facilitate rapid operation of the machine a coiled spring, $80^x$, is stretched from the transverse tie rod, 2, which connects the two standards at the lower forward side, to a connection at $85^a$, on the segment plate, 80, at the left hand end of the shaft, 5, at a distance from the center, which spring is stretched by the rocking movement in adding direction.

For the purpose of "listing" or making a removable record of the successive set-ups and totals the following described mechanism is added to that thus far described.

Suitably journaled on their respective carrying plates fulcrumed side by side on a shaft, 100, are printing wheels, $X^1$, $X^2$, $X^3$, $X^4$, $X^5$, $X^6$ and $X^7$, (Figures 9, 25 and 27) one for each of the column mechanisms. For operating these number wheels the mechanism is as follows:

On each master gear, 40, there is mounted rigidly with it, a gear, 101, with which a rack bar, 102, is adapted to mesh, the said rack bar being of the nature of a pitman or link connected at the end remote from its gear engagement, with a radius arm or lever arm, $107^a$, of a lever plate, 107, which is pivoted by a screw at $107^b$, to a printing wheel carrying plate, 109. Mounted for sliding vertically on the pivot, $107^b$, is a rack plate, 112, which is slotted at $112^a$ for such sliding, and is further guided in said sliding movement by having a second slot, $112^b$, engaging a guide stud, $112^c$. Said rack bar, 112, has its rack, $112^d$, meshing with a pinion, 120, journaled on a shouldered screw, $107^e$, set in the printing-wheel-carrying plate, 109, said pinion being rigid with a printing wheel, as $X^1$, which has peripheral printing faces for the numeral characters from zero to 9 inclusive.

Said printing wheel carrying plates, 109, of all the column mechanisms are designed to be rocked as a unit over their supporting shaft, 100, for carrying the printing wheels as a unitary group to and from the paper on the platen roll of the printing device as hereinafter described. For giving said printing wheel carrying plates their movement for advancing the printing wheels to and retracting them from the paper on the platen, and also for operating the paper and ink-ribbon feed hereinafter described, and for releasing the printing wheels from the setup to permit them to return to zero position after printing, the following mechanism is provided:

Similar cam plates, 110, 110, (Figures 8, 9 and 27) which are carried rigidly by the shaft, 5, at opposite ends of the assemblage of column mechanisms, have each the features and connections for operating the printing mechanism which will now be described by reference to one of said cam plates and its connections, it being understood that they are both alike in all respects. A cam slot, $110^a$, is positioned in the cam plate and dimensioned to afford a path in an arc of the rocking movement of the cam plate with the shaft, 5, about its axis, for the stud, $106^a$, which projects from a lever arm, 106, of the lever, 106—$106^x$, fulcrumed on a shaft, 105, carried by the end standards, 1, 1, through so much of said movement of the cam plate from rest position as is concerned in the adding of the set-up numerals, not including the movement for carrying; and at 110ᵉ the slot diverges outward forming a cam shoulder for giving the lever, 106, movement away from the gear sufficient to disengage the rack bar from the gear; the remainder, 106ᶜ, of the slot being in an arc suitable for holding the rack bar, 102, carried by said lever arm, 106ˣ, as hereinafter described, disengaged through the carrying part of the stroke, and through the return stroke to the point of disengagement. The engagement of the rack bar, 102, with the lever arm, 106ˣ, is by means of a stud, 106ᵈ, projecting from the lever arm into a slot, 102ᵃ, in the rack bar. It will be understood that the angle through which the printing wheel is rotated for setting up the number to be printed, must correspond to the angle through which the master gear and the gear, 101, are rocked in producing the adding on the numeral wheels. The mechanism for actuating the printing wheel from the gear 101, is contrived with this capacity in view. The rack plate, 112, has a cross-head, 112ᶠ, extending alongside the cross arms, 107ᶜ, of a lever plate, 107; said cross arms have abutments, 107ᵈ, which engage under the cross-head 112ᶠ, so that the rocking of the lever plate, 107, in either direction thrusts upward the rack plate, 112, rotating the printing wheel through an angle depending upon the angle through which the lever plate is rocked, which in turn depends upon the angle through which the gear, 101, is rocked, which, finally, is proportioned to the number added, i. e., the number of the digit key operated. The direction of thrust of the rack bar, 102, with respect to the lever arm, 107ᵃ, the angle of the under face of the cross-head to the direction of the lever cross arm, 107ᶜ, and the relative lengths of the radius of the gear, 101, and of the lever arm, 107ᵃ, are such as to cause equal angular or rotary movements of the gear, 101, to yield equal thrust movement of the rack bars, 112, and thereby equal angular or rotary movement of the printing wheels, X¹–X⁷; the difference between the radius of the gear, 101, and the operative length of the lever arm, 107ᵃ, is also made to compensate the movement which is necessary, as hereinafter described, of the entire printing wheel operating mechanism toward and from the gears, 101.

Upon considering the operation of the above described printing mechanism in relation to the rotation of the number wheels, of the adding mechanism corresponding respectively to the printing wheels, X¹–X⁷, in the adding stroke of the handle, 8, and rocking movement of the operating plate, 30, it will be understood that the printing wheels are not actuated during the carrying portion of said stroke and rocking movement; so that the printing wheels will each present to the paper on which the printing is to be done, as hereinafter described, the digit of the digit keys which have been depressed in the set-up.

The carrying portion of the stroke is utilized for printing the set-up, retracting the printing wheels from the paper, reversely rotating the printing wheels to zero, feeding of the paper on which the set-up is printed and giving the step feed to the printing ribbon. The devices for this purpose will now be described.

And first it is to be noticed that it is not desired to print from the printing wheels which, if advanced for printing, would print zero in places of higher denomination than contained in the number set up; and to avoid advancing the number wheels in such columns, and at the same time provide for printing zero where it appears in the set up number, requires certain special expedients which will be first described.

The printing wheel carrying plates, 109, (Figures 3, 7 and 9) are connected by springs, 114, stretched from the lower end of said plates to a cross-rod, 114ᵃ, of the frame structure, for retracting the lower ends of the plates and advancing toward the record paper and platen roll, 115, the upper end at which the printing wheels are carried; but said plates are normally locked at position shown in Figure 3, with the printing wheels at retracted position by means of latches, 116 and 117. The latches, 116, are individual for each plate, 109; but the latch, 117, is a bar extended across all the plates, for latching or releasing them all by a single movement in one direction or the opposite direction. The lever arms, 117ᵃ, which carry the latch, 117, extend from a rock shaft, 117ᵇ, which has an operating lever arm, 118, extended in position to overhang by its forward hooked head, 118ᵃ, the head end, 110ᵐ, of a cam trip, 110ʳ, pivoted on the inner side of the cam plate, 110, held by a spring, 110ⁿ, with its tail end, 110ᵖ, stopped against a stud, 110ᵠ, and its head normally in the path of said lever head, 118ᵃ, for actuation of the lever by the rotation of the cam plate as hereinafter explained. Each of the latches, 116, has an arm, 116ᵃ, which extends up alongside the downwardly-extended stem, 112ʲ, of the rack plate, 112, and has a stud, 116ᶜ, projecting across the edge of said stem for engaging a cam shoulder, 112ʰ, thereon. When the rack plate is thrust up by the rocking of the lever plate, 107, as described see Figure 5, the cam shoulder, 112ʰ, encountering the stud, 116ᶜ, rocks the latch, 116, free of the top shoulder or hook, 109ᵃ, of the plate, 109, leaving said plate free to swing inward at the lower end for carrying the printing wheel at its upper end toward the platen roll. Such movement cannot occur until the cam head, 110ᵐ, of the cam trip, 110ᵈ, on the cam plate, 110, encounters the hook end, 118ᵃ, of the lever arm, 118, and rocks the latch bar, 117, out of engagement with the stop shoulders or hooks, 109$^b$, of the plates, 109. The cam trip is positioned on the cam plate, 110, for encountering the said hooked end, 118$^a$, during the carrying portion of the rocking of the operating plate, 30; and the printing wheels whose carrying plates, 109, have been released from the detent latch, 116, are then advanced toward the platen rolls for printing the set-up on the paper strip which intervenes, as hereinafter described, and the latch bar, 117, is retracted by a spring, 117$^x$, to position for re-engagement with the hook, 109$^b$, when the plate, 109, is rocked back to rest position.

Immediately following the printing swing of the plates, 109, the cam shoulder, 110$^e$, on the periphery of the plate, 110, encounters an abutment, 120$^a$, carried by an arm, 120, of a bell crank lever, 120—121, whose arm, 121, carries an abutment, 121$^a$, for encounter in the movement caused by the cam shoulder, 110$^e$, with the forward edge, 109$^d$, of the plate, 109. Said encounter rocks the plate, 109, in a direction for retracting the printing wheel from the platen roll. Immediately following the retraction of the printing wheel, a cam shoulder, 110$^e$, on the periphery of the plate, 110, encounters the end, 122$^a$, of a lever, 122, fulcrumed on the tie rod, 3, which connects the end standards, 1, 1, and rocks that lever in a direction to cause the rod, 124, carried rigidly by said lever arm and its duplicate at the opposite end of the assemblage of column mechanisms, down upon the tails, 126$^a$, of the detent dogs, 126, which are fulcrumed on a shaft, 126$^x$, extending between the standards, 1, 1, for retaining the rack bars, 112, at the position to which they are thrust by the action above described for "setting up" the printing wheels, said rack bars having each ratchet toothed edges opposite the racks, as seen at 112$^s$, for engagement of the detent dogs. The dogs, 126, being released by the action described, the rack plates, 112, are returned to rest position, and the printing wheel to zero position, by the springs, 127, stretched from the lower ends of the rack plates to the fingers, 109$^h$, provided for that purpose on the plates, 109; and this return movement of the rack plates restores the lever plates, 107, to their normal or rest position, retracting the rack plates, 102, likewise to their normal position, ready for re-engagement with the gears, 101, upon the reverse rocking of the plates, 110, bringing the cam shoulder, 110$^d$, into encounter with the abutment, 106$^a$, of the lever, 106, which occurs, as it will be understood, in the reverse movement of the operating handle, 8, from the limit of the carrying portion of its advance movement back to the initial point of said carrying movement. It will be remembered that the master gears, 40, are not actuated during the reverse movement from the point last indicated back to the position of rest, and consequently the gear, 101, being carried with the master gear causes no movement of the rack bars, 102, during the return to rest position; and therefore, at rest position the printing mechanism stands also at rest position,—that is, with the printing wheels each returned to zero and the entire group retracted from the platen roll.

It will be observed that for any column in which the set up number is zero (0), the catch lever, 116, will not be operated for releasing the printing-wheel-carrying plate, 109; and that consequently, in the absence of special provision, there would be no imprint made for that column. This is as desired with respect to all columns of higher denomination than any in the number set up; but it is desirable to print zeros occurring in the number set up; and for that purpose the levers, 116, have each a forwardly-projecting tail, 116$^d$, these tails all standing parallel alongside each other as seen in Figure 13; and from each tail a finger, 116$^b$, is projected laterally to overhang the next tail at the left. This causes the movement of said next tail which occurs when said next lever, 116, at the left is actuated (by cam shoulders, 112$^h$) for releasing the corresponding number-wheel-carrying plate, 109, to similarly actuate the next lever, 110, at the right, causing it to release its number-wheel-carrying plate so that the zero presented by the number wheel thereon will be printed.

The paper feed and ink ribbon feed devices of the printing mechanism will now be described.

Said paper and ribbon feed devices, including the platen roll, are mounted above a plate, 130, (Figures 2, 3, 5, 7, 9 and 10) carried by the end standards, 1, 1, and having an aperture, 130$^a$, through which the plates, 109, carrying the printing wheels and their operating devices protrude from below. The platen roll, 115, is carried by a shaft, 132, which extends between the end standards. Made fast on one end of the shaft, 132, is a ratchet disk, 132$^a$, (Figure 2) for engagement with which there are provided two pawls, 133, 134, the former being the feed pawl and the latter the detent pawl. The feed pawl, 133, is pivotally carried on a plate, 131, which rocks over the shaft, 132, and has a lever arm, 135$^a$, extending rearward for encounter therewith of an abutment, 122$^g$, at the end of an extension, 122$^x$, of the right-hand lever, 122. When said lever, 122 and 122$^x$, is rocked by the encounter of the lever arm, 122, with the cam shoulder, 110$^e$, on the cam plate, 110, for releasing the detent, 126, as described, the same rocking movement causes the abutment, 122$^g$, to actuate the feed pawl, 133, for rotating the platen roll one step for feeding the paper strip, 140. The paper strip runs from a supply roll, 141, (Figure 9) between the platen roll and a pressure or tension roll, 142, positioned behind and below the platen roll, and held pressed against the latter by being carried on an arm, 143ª, (Figure 2) of a rock shaft, 143, carried on the end standards and having an arm, 143ᵇ, from which a spring, 146, is stretched to a point of attachment at 146ª, on the plate, 130. The detent pawl, 134, is fulcrumed on the end standard, 1, and held engaged with ratchet disk, 132ª, by a spring, 147, stretched from the tail, 134ª, of the detent dog, 134, to a point of attachment on the supporting frame.

A lever arm, 143ˣ, extends upward from the rock shaft, 143, in position to be conveniently engaged with one finger by the operator while seizing the paper strip, 140, to withdraw it from around the platen. A slight forward pull on said finger retracts the tension roll, 142, from the platen roll, and releases the paper without disturbing the engagement of the detent dog, 134.

150 (Figures 3, 5 and 7) is a paper strip guide scroll mounted fixedly on the plate, 130, curved around under the platen roll and having apertures, 150ª, for exposure of the platen and the paper thereon to the stroke of the printing wheels, and 150ᵇ and 150ᶜ (Figure 10) for the tension rolls. The forward upper edge, 150ᵈ, of the paper guide scroll is serrated to facilitate its use as a tearing edge for tearing off the portion of the paper strip which runs above it and bears the imprint.

153 (Figure 3) are detents each having its head, 153ª, sloped on both faces for engaging between consecutive numeral-printing projections on the respective printing wheels. The detents engage the projections for accurately positioning the printing wheels for printing, being disengaged when the wheels are to be positively rotated by the respective racks. For this purpose each of detents, 153, is fulcrumed on the stud, 126ˣ, and has a tail, 153ᵇ, projecting forward for engagement above them of the bar, 124, carried as already described by the arms, 122. The tails, 153ᵇ, are of such length only that they are overhung and acted upon by the bar, 124, only when the printing wheels and their carriers and associated parts are retracted from the platen roll, said tails being withdrawn from under the bar, 124, by the printing movement of the printing rolls. Thus automatically the heads of the detents are lodged between the number projections and hold the printing wheels accurately positioned for printing when the printing wheels are advanced toward the platen for printing. And the tails, 153ᵇ, are cam shaped at their ends for engaging under the bar, 124, in the opposite swing of the printing mechanism and thereby the detents are carried out of engagement with the printing wheels and so remain during the processes of setting the printing wheels for a new number.

The ink-ribbon-carrying-and-seating devices comprise two spools, 160 and 161, (Figures 2, 3 and 10) to and from which the ribbon is wound back and forth, extending between the printing wheels and the path of the paper strip over the platen. Each action of the rocking arms, 122, caused by the cam shoulder, 110ᵉ, (Figure 9) causes the depending finger, 122ᵉ, on the lever extension, 122ˣ, to engage the arm, 163, of a bell crank lever, 163—164, whose arm, 164, extends rearward and engages a bar, 165, which is mounted on the plate, 130, for sliding transversely of the path of the paper strip. On the bar, 165, there is mounted and guided for longitudinal sliding on said bar a feed bar, 166, which at each end carries a feed pawl, 167, for engaging a ratchet, disk, 168, on the ribbon spool at that end, the construction of the two ends being substantially alike. The bar, 165, carries a dog, 169, (Figure 10) whose head has equally and oppositely sloped faces, 169ª, for engaging similarly sloped teeth, 166ª, on the edge of the bar, 166, said teeth being three in number providing two interspaces for engagement of the dog. A detent pawl, 170, pivoted to the plate, 130, cooperates with the feed pawl, 167, for holding the ratchet against rotation in the intervals of the feeding movement. Pivoted on the plate, 130, is a spring-actuated trip lever, 171, having a flat pressure finger, 172, which bears tangentially on the ribbon roll wound on the spool. The other end of the trip lever is positioned for the encounter of an abutment, 173, carried by the bar, 166. Such encounter occurs when the spool is emptied, as will appear from the further description of the operation. Upon the encounter of said abutment with the end of the lever, 171, in any feed stroke of the bar, 165, caused by the rocking of the lever, 122, as described, the bar, 166, being prevented by the encounter of said abutment with the end of the trip lever from moving in the direction of the feed stroke, the bar, 165, will move longitudinally under and with respect to the bar, 166, the dog, 169, slipping over the intervening tooth, 166ª, from one recess to the other and engaging said other for holding the two bars in changed longitudinal relation to each other. Then on the reverse stroke of the bar, 165, which is caused by the spring, 174, stretched from a tail, 164ª, of the bell crank lever, 163—164, to a fixed point of attachment on the plate, 130,—the bar, 166, is carried back to initial position. In this back stroke a tooth, 166ᵇ, on the edge of the bar, encounters the tail, 170ª, of the detent, 170, and disengages the detent from the ratchet disk. Simultaneously the sloping inner side of the pawl, 167, is drawn over the stud, 177, fixed in the plate, 130, and the pawl is thereby disengaged from the ratchet disk. At the opposite end of the bar, 166, the opposite action occurs,—that is, the feed disk and feed pawl are released out of engagement with the ratchet disk, and the spool at that end is thereupon rotated step by step for winding the ribbon onto it and withdrawing it from the spool, 160, until said spool, 161, in turn becomes empty when the reversing action described at the right hand end is repeated at the left hand end of the ribbon feeding mechanism.

It will be observed that in the sum-clearing movement of the adding mechanism, the rearward swinging movement of the handle, 8, the rack bars, 102, are engaged with the gears, 101, and said rack bars are thereby actuated to an extent corresponding to the numbers to be cleared on the respective number wheels. It results, obviously, that in this clearing movement the printing wheels will be actuated each to an extent corresponding to said respective number wheels. These numbers represent the sum or total of the numbers which have been set up between the last two clearing operations; and when after a clearing operation the handle, 8, is rocked past the rest position back to the limit of its throw in that direction, all the movements for printing will be performed, and the totals set up on the printing wheels as above described, will be printed on the paper strips at the foot of the column of previously printed successively set up numbers.

It will be observed that the master gears, 40, and printing mechanism operating gears, 101, are necessarily spaced apart so that each column mechanism occupies several times as great a distance in axial direction as each of the corresponding printing wheels. It thus becomes necessary in transmitting movement transaxially of said column mechanisms to their respective printing wheels to offset the motion transmitting parts of all but one of the column mechanisms to the respective printing wheel actuating devices, the one exception being any one which may be chosen for location of the printing wheel in transaxial alignment with the column mechanism; and obviously the middle one would be the one to select for such alignment. When, therefore, there are seven column mechanisms and seven printing wheels as shown, such offsetting means must be employed in the case of three of them to the right and three of them to the left of the center. The elements which I prefer to make thus offset are those hereinabove called the lever plates, 107. These lever plates have thus far been described in terms applicable strictly to the middle one which is in alignment with the column mechanism to which it pertains. That is, as if they were flat plates with all their lever reaches in the same vertical fore-and-aft planes, or as they may appear in side elevation. But in fact, and of necessity for the reasons indicated, they are preferably formed as seen in Figures 14 to 20, inclusive.

These lever devices, except the center one, each comprise parts in two parallel vertical fore-and-aft planes, whose distance apart is the amount of offset made necessary by reason of the excess of width of the column mechanism over that of the printing wheels as above mentioned. These two laterally offset parts are respectively, as to function, an actuated and an actuating lever arm. In view of the fact that the several printing-wheel-carrying plates, 109, on which these off-central lever devices are fulcrumed are themselves required to function by rocking over a fixed fulcrum, and that therefore the axis of the rocking movement acquired of the off-central lever devices is changeably positioned, it is impossible to extend a rock shaft at the axis, for connecting the offset actuated and actuating arms; and they must therefore be connected at a line remote from the axis,—that is, the connector between them is necessarily a bar offset from and parallel with said axis and by reason of that relation hereinafter mentioned and described as a "paraxial" bar. These paraxial bars and their respective connections extending to the axis must have each a clear path of movement in an arc about the axis of the lever device adequate for that required for their maximum work,—namely, setting the printing wheel for the highest digit, 9. As the printing wheel actuating connections are designed in the present drawing, this arc is about 36 degrees; and the paraxial bars of the three offset lever devices are therefore necessarily distributed in the circle in which they swing,—and the carrying arms of these actuating arms are likewise distributed,—at intervals not less than 36 degrees plus the arc occupied by the bar itself and its connecting arm which is about 15 degrees. Also there is necessarily excluded from the arc in which the paraxial bars and their connecting arms may swing, the portion of the circle occupied by the rack bars, 112, which in the drawings is about twenty degrees, and the arc required for movement of the actuating rack bar, 102, which is connected to the end of the acuated lever arms. This necesary distribution of the paraxial bars and their connections to the axis will be described in detail. These off-central lever devices now to be described are for convenience distinguished from the central one, 107, by being denoted respectively, X—107, Y—107 and Z—107. (Figures 14 and 20.)

From one end of the cross bar, 107, of the lever devices, X—107, and from the opposite end of the cross bar of the device, Y—107, and from the end of radius arm, Z—107, there are extended respectively paraxial bars, X—107$^m$, Y—107$^m$ and Z—107$^m$, reaching to the fore-and-aft planes respectively, of the respective actuating rack bars, 102, and from the ends of said paraxial bars in said respective fore-and-aft planes or immediately adjacent thereto, reaches, X—107$^p$, Y—107$^p$, and Z—107$^p$, are extended to points in alignment with the pivotal connections of the rack bar, 102, with the radius arm, 107ª, of the central lever plate, 107; and at said points pivotal connection is made with said respective rack bars. The offset connection thus produced from the rack bars, 102, to the rocking cross bars, 107, in each case might serve for transmitting the necessary movement to the rack bars, 112; but without axial support in the plane of the actuating cross bars, 107, said connection lacks proper stiffness for reliable operation; and this is remedied by providing for each of said devices, X—107, Y—107 and Z—107, a bracket to afford pivotal support, said bracket having respectively arms, X—137ª, Y—137ª and Z—137ª, extending to the axis in common of all said lever devices, X—107, Y—107 and Z—107; and for the several arms, X—107ᵇ, Y—107ᵇ and Z—107ᵇ, rigid reaches, X—107ʳ, Y—107ʳ and Z—107ʳ, extend to said axis, at which said reaches are pivoted to said bracket arms, X—137ª, Y—137ª, and Z—137ª, which are variously shaped as shown coaxially with the paths of swing of the several paraxial bars of said lever devices respectively. Said brackets have arms, X—137ᵇ, Y—137ᵇ and Z—137ᵇ, extending from the fulcrum shaft, 100, of all the printing wheel carrying plates, rearward, and secured rigidly to rigid paraxial reach rods, X—137ᶜ, Y—137ᶜ and Z—137ᶜ, which extend to the plates, 109, which carry the rack bars, 112, corresponding to the rocking cross bars with which the said brackets are respectively connected. Said paraxial rods, X—137ᶜ, Y—137ᶜ and Z—137ᶜ, are offset laterally from each other in an arc about the axis of the shaft, 100, sufficiently to be out of each other's paths in the rocking movement of said lever plate; and the intermediate ones of said plates are slotted as seen at 137ᶠ, to accommodate said paraxial reach rods which must extend through these intermediate plates and accommodate the rocking movement of said plates.

Number wheels are obviously not the only type of registering devices which can be employed in co-operation with the characteristic features of the mechanism shown and described above; and it is likewise obvious that these characteristic features are not limited in their applicability to the type of manually-operable number-selecting means consisting of individual digit keys for each number in each column as herein shown. In the following claims, therefore, the term "registering devices" and "manually-operable number-selecting means" or the like, referring respectively to the number wheels and the digit keys of the structure shown, are not to be taken as limited to number wheels or digit keys respectively.

I claim:—

1. In a construction for the purpose indicated, in combination with a fixed support, a registering device mounted thereon; a master gear wheel by which the registering device is rotated; master-actuator; a locking dog carried by the master-actuator for engaging the master wheel with said actuator; a cam-encountering abutment carried by the dog; a cam for encounter of the abutment to force the dog into master-engaging position; a lever pivoted on the dog for carrying said abutment movably with respect to the dog; a catch on the dog having means for engaging the abutment-carrying lever to lock it positively on the dog at cam-encountering position of the abutment, and means for releasing the catch in the latter part of the stroke of the master-actuator in the direction for the cam's encounter with the abutment, and after the abutment has passed the cam.

2. In combination with the structure defined in claim 1, means on the fixed support which positively actuates the abutment-carrying lever after the release of the catch to move and hold the abutment out of range of the cam.

3. In a structure for the purpose indicated, in combination with a supporting part, a master locking dog, a cam-encountering abutment and a movable part by which it is carried on the dog; a catch on the dog which engages the abutment-carrying part to positively lock the abutment at cam-encountering position, said catch being exposed for encounter for releasing said part, and means on the fixed support adapted for such encounter to move said abutment-carrying part out of cam-encountering position of the abutment.

4. In a structure for the purpose indicated, in combination with a fixed support, a registering device mounted thereon and a pinion connected with the registering device for rotating the same; a master gear meshing with the pinion; a master-gear-actuator mounted for rocking about the axis of the master gear; a dog for engaging the master-actuator with said master gear; a dog for engaging the master gear with the fixed support; means for actuating the first mentioned dog for engaging the master gear; operating connections between the two dogs for simultaneously disengaging the second and engaging the first, and means for reversing said engagement; said first mentioned means comprising a manually-operable cam and an abutment for encounter therewith carried by one of said dogs.

5. In the construction defined in claim 4 foregoing, the second mentioned means comprising co-operating abutments, one in the connection between the two dogs and the other on the master actuator which come into mutual encounter at the limit of the cam's engagement with the cam-encountered abutment.

6. In a computing machine, a column mechanism having number-registering devices, a master gear for rotating the registering devices, and a rocking actuator for the master gear, a dog which locks the master gear against rotation; a dog which engages the master gear with the actuator; said actuator comprising a plate having a locking-dog-controlling periphery, the locking dog having abutments which project past said periphery for co-operation therewith, said periphery comprising projecting and recessed parts positioned for holding the dog at master-locking position at a selected rest position of said locking actuator, and for permitting it to withdraw from said locking engagement during the rocking movement of the actuator for adding the set-up numeral and a projecting part for forcing and holding the dog in locking engagement during a succeeding portion of the rocking movement in the same direction to the limit thereof, and lever connections between the said master-locking dog and master-engaging dog for causing the movement of the one to be communicated to the other in the directions for disengaging each by the engagement of the other.

7. In a machine for the purpose indicated, in combination with a supporting structure; a master gear mounted for rocking movement, a rocking actuator for said master gear, a pinion with which the master gear meshes, a registering device rotated by the pinion; means for locking the master gear to the fixed support; means for engaging the master gear with the rocking actuator, the registering member making its full rotation in steps whose numbers are a multiple of ten; a group of nine cams whose cam lengths are graduated from one to nine, adapted to be individually set for controlling the means for engaging the master with the rocking actuator, and means for so setting the cams individually.

8. In the construction defined in claim 6 foregoing, the means for locking the master to the support being a spring-actuated dog having an abutment, the actuator comprising a plate having a periphery which forms a guide for the abutment and a cam for controlling it in the rocking movement of the actuator, said periphery being shaped to hold the dog in master-locking position at the limit of the angular movement of the actuator corresponding to the arc occupied by the cam which controls the means for engaging the master with the actuator.

9. In a computing machine a column mechanism comprising a master gear and a master actuator and a fixed support for the same, means for engaging the master gear with the actuator comprising a dog carried by the actuator having an abutment movable on said dog to encounter or avoid the co-operating means on the support, and means on the support for moving said abutment to the position for avoiding said encounter, adapted to so move it during the latter part of the actuator's movement in the direction for adding, and after it has moved through the entire nine steps for adding the set up numbers.

10. In a computing machine a column mechanism comprising a master gear and a master actuator and a fixed support for the same, means for engaging the master gear with the rocking actuator comprising a dog on said actuator, an abutment carrying arm pivoted to the dog, a latch for holding said arm positioned on the dog at cam-encountering position of the abutment, a cam for encountering the latch to disengage it from the abutment-carrying arm and hold it disengaged, and a second cam positioned for encountering the abutment on the arm to move it out of cam-encountering position, said cams being positioned for making their respective encounters during the latter part of the stroke of the actuator in adding direction after it has moved the entire nine steps for adding, said first mentioned cam of the releasing device being extended for holding the latch at disengaged position, and the abutment to move the arm out of cam-encountering position, said latch-releasing cam being positioned for making its encounter during the latter part of the stroke of the actuator in the adding direction after it has moved the entire nine steps for adding.

11. In a computing machine a column mechanism comprising a master gear and a master actuator and a fixed support for the same, means for engaging the actuator with the master comprising a dog on the actuator having an abutment movable on the dog to encounter or avoid the co-operating means on the frame support; an arm pivoted on the dog for carrying said abutment, and means on the support positioned for encountering said arm to move it into cam-encountering position of the abutment in the concluding part of the actuator's reverse movement to initial position, and a spring-operated latch for engaging it to lock it on the dog at that position.

12. In a computing machine a column mechanism comprising a master gear and a master actuator and a fixed support for the same, means for engaging the master with the actuator, comprising a dog carried by the actuator having an abutment movable on the dog to encounter or avoid the co-operative means on the support; an arm pivoted on the dog for carrying said abutment movably; a catch to lock the abutment carrying arm at positions for encounter with co-operating means on the support.

13. In a computing machine in combination with a plurality of column mechanisms each comprising number registering devices and carrying devices, a cam plate which is operative in the registering and carrying actions, a movement-communicating member actuated by the adding movement of the number registering devices and means for disengaging said member during the carrying action; a printing wheel; a plate for carrying the printing wheel mounted for movement to carry said wheel to printing position, the cam plate having an operating feature for controlling the printing movement positioned for causing said movement and retraction during the disengagement in the carrying action.

14. In a computing machine in combination with a plurality of column mechanisms each comprising number registering devices and carrying devices; a cam plate which is operative in the registering and carrying actions, a movement communicating member actuated in the adding movement of the number registering devices and means for disengaging said member during the carrying action; a printing wheel; a paper feeding device; a plate for carrying the printing wheel mounted for movement to carry said wheel to printing position; and a cam plate having an operating feature for controlling the paper feeding movement positioned for causing said movement to occur during said disengagement in the carrying action.

15. In a computing machine a plurality of column mechanisms each comprising number registering means and carrying means, each of said mechanisms having a master member which is a complete gear wheel and an actuator therefor; all of said column mechanisms having a shaft-in-common on which they are mounted and about whose axis the said masters are rocked, a handle for rocking said shaft; operating plates carried by said shaft extending past the extreme right-hand and left-hand column mechanisms; and a rod connecting said operating plates and engaging the master actuators of all the column mechanisms.

In testimony whereof, I have hereunto set my hand at Chicago, Illinois, this 12th day of January, 1920.

GEORGE BROWNING.